(12) United States Patent
Tokugawa et al.

(10) Patent No.: US 9,428,264 B2
(45) Date of Patent: Aug. 30, 2016

(54) NOSE FOR SUPERSONIC FLYING OBJECT

(75) Inventors: Naoko Tokugawa, Chofu (JP); Taro Kawai, Chofu (JP); Ayako Tozuka, Chofu (JP); Yoshine Ueda, Chofu (JP); Hiroaki Ishikawa, Chofu (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 506 days.

(21) Appl. No.: 13/881,307

(22) PCT Filed: Oct. 21, 2011

(86) PCT No.: PCT/JP2011/074313
§ 371 (c)(1),
(2), (4) Date: Apr. 24, 2013

(87) PCT Pub. No.: WO2012/060230
PCT Pub. Date: May 10, 2012

(65) Prior Publication Data
US 2013/0214094 A1    Aug. 22, 2013

(30) Foreign Application Priority Data

Nov. 2, 2010    (JP) ................................ 2010-245896

(51) Int. Cl.
| | |
|---|---|
| *B64C 21/10* | (2006.01) |
| *B64C 1/00* | (2006.01) |
| *B64C 30/00* | (2006.01) |
| *F42B 10/46* | (2006.01) |

(52) U.S. Cl.
CPC ............. *B64C 21/10* (2013.01); *B64C 1/0009* (2013.01); *B64C 30/00* (2013.01); *F42B 10/46* (2013.01); *B64C 2001/0045* (2013.01); *Y02T 50/12* (2013.01)

(58) Field of Classification Search
CPC ..... B64C 1/0009; B64C 21/10; B64C 30/00; F42B 10/46; F42B 10/52
See application file for complete search history.

(56) References Cited

U.S. PATENT DOCUMENTS 2,980,370 A * 4/1961 Takacs .......................... 244/130
3,009,669 A    11/1961 Locke
3,434,417 A *  3/1969 Schroth ......................... 102/386

(Continued)

FOREIGN PATENT DOCUMENTS

JP    5-509274 A    12/1993
JP    2004-10020 A    1/2004

(Continued)

OTHER PUBLICATIONS

International Search Report for the Application No. PCT/JP2011/074313 mailed Nov. 22, 2011.

(Continued)

*Primary Examiner* — Nicholas McFall
(74) *Attorney, Agent, or Firm* — Cheng Law Group, PLLC

(57) ABSTRACT

Provided is a nose for a supersonic flying object, which has a natural laminar flow nose shape capable of suppressing laminar-turbulent transition and drastically reducing a frictional drag. The nose for a supersonic flying object has a low resistive body shape symmetrical about a central axis as a base shape, wherein the base shape is approximately a cone shape having a linear, simple convex curve, or simple concave curve generatrix and a deformation element having a wavy shape is added to the base shape.

4 Claims, 20 Drawing Sheets

(56) References Cited

U.S. PATENT DOCUMENTS

| | | | |
|---|---|---|---|
| 4,616,568 A * | 10/1986 | Serge | 102/501 |
| 7,093,792 B2 | 8/2006 | Fujino et al. | |
| 2005/0218267 A1 | 10/2005 | Makino | |
| 2005/0230531 A1 | 10/2005 | Horinouchi | |
| 2007/0145192 A1 | 6/2007 | Henne et al. | |

FOREIGN PATENT DOCUMENTS

| | | |
|---|---|---|
| JP | 2005-178491 A | 7/2005 |
| JP | 2005-297825 A | 10/2005 |
| JP | 2005-525260 A | 8/2008 |
| WO | WO-92/01602 A1 | 2/1992 |

OTHER PUBLICATIONS

Fujino, Michimasa et al., "Natural-Laminar-Flow Airfoil Development for a Lightweight Business Jet". Journal of Aircraft, Jul.-Aug. 2003, vol. 40, No. 4, pp. 609-615.

Tokugawa, Naoko et al., "Transition Measurement of Natural Laminar Flow Wing on Supersonic Experimental Airplane NEXST-1", Journal of Aircraft, Sep.-Oct. 2008, vol. 45, No. 5, pp. 1495-1504.

Ueda, Yoshine et al., "Three Dimensional Boundary Layer Transition Analysis in Supersonic Flow Using a Navier-Stokes Code", 24th International Congress of the Aeronautical Sciences, 2004, pp. 1-15.

* cited by examiner

Fig. 13
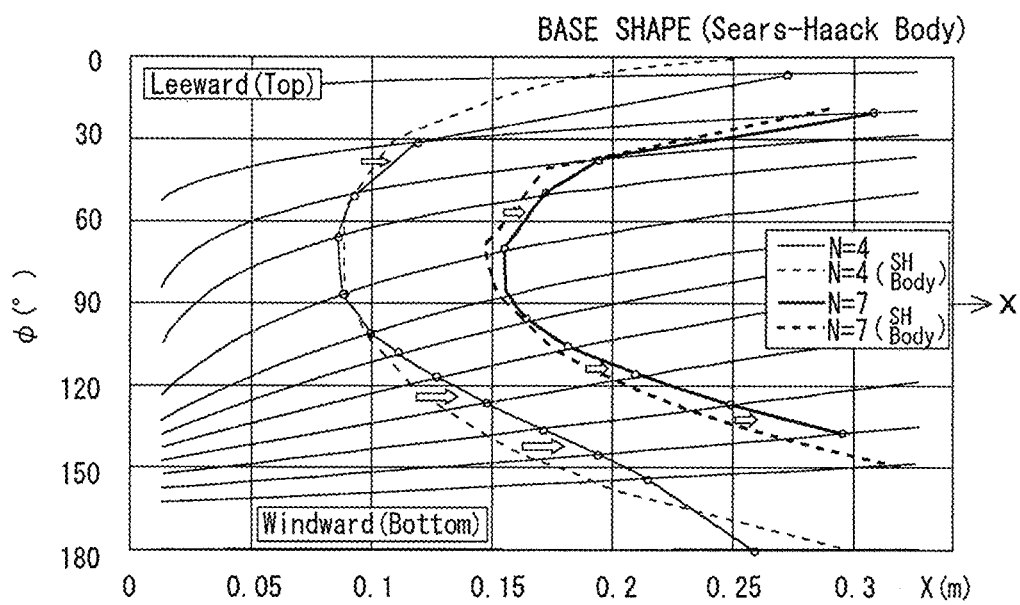
Fig. 14 NATURAL LAMINAR FLOW NOSE
500
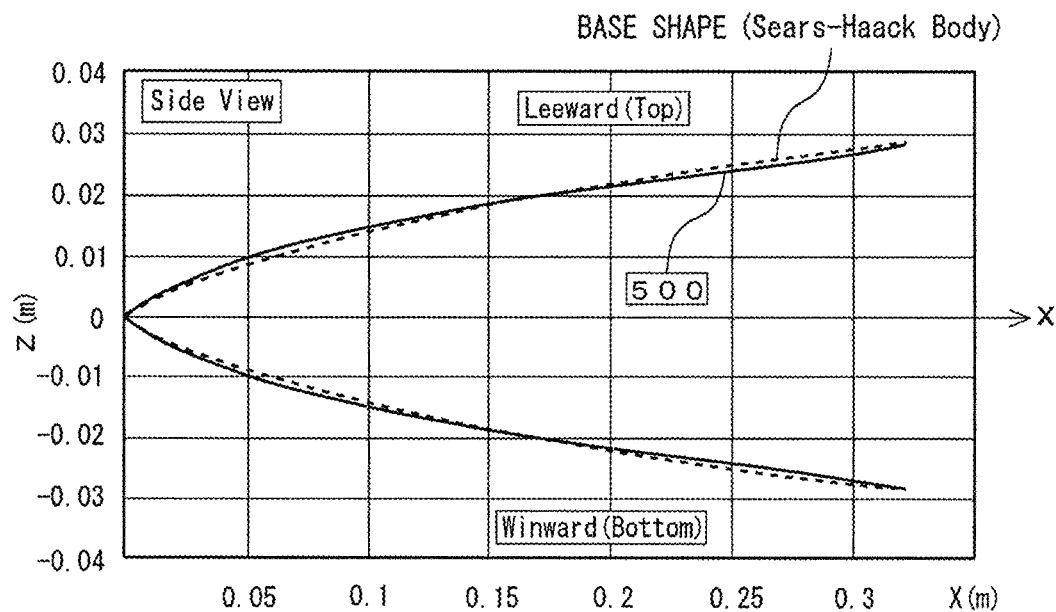

NOSE FOR SUPERSONIC FLYING OBJECT

TECHNICAL FIELD

The present invention relates to a nose for a flying object that flies at supersonic speed, and more particularly to a nose for a supersonic flying object having a shape capable of delaying a boundary layer transition so as to reduce frictional drag.

BACKGROUND ART

It is known that when a boundary layer is laminar, frictional drag is greatly reduced in comparison with a case where the boundary layer is turbulent. Therefore, to reduce frictional drag in a nose-shaped object of an aircraft placed in a flow, it is desirable to suppress a laminar-turbulent transition of a boundary developed formed on a surface in order to delay a transition location as far as possible.

It is also known conversely that when the boundary layer is turbulent, separation of the boundary layer is suppressed in comparison with a case where the boundary layer is laminar, leading to a large reduction in pressure drag. Therefore, the boundary layer transition from a laminar flow to a turbulent flow is also advanced in order to reduce pressure drag caused by separation of the boundary layer on a nose-shaped object of an aircraft placed in a flow.

Adjusting a surface shape of an object in order to suppress the laminar-turbulent transition of the boundary layer and thereby delay the transition location is known as natural laminarization of boundary layer. Natural laminarization of boundary layer for a supersonic aircraft has been applied to a design for a main wing of a "scaled supersonic experimental airplane" (National Experimental Supersonic Transport; NEXST-1) developed by the Japan Aerospace Exploration Agency (JAXA), and an effect thereof has been validated by a flight experiment (see Non-Patent Document 1, for example).

Incidentally, when an angle of attack, or in other words an angle formed by an airflow and an object axis, of a nose-shaped object of an aircraft placed in a supersonic flow is zero, all flows on the object surface are aligned with a generatrix, and therefore exhibit axial symmetrically.

In this case, the boundary layer flow of the object surface is uniform in a circumferential direction, and velocity variation therein appears only in a perpendicular direction to the surface and the generatrix direction. Therefore, the laminar boundary-layer flow on the object surface in this case is known as a two-dimensional boundary layer. It is known that in a two-dimensional boundary layer, the laminar-turbulent transition is governed by Tollmien-Schlichting wave type instability.

When the angle of attack is not zero, on the other hand, a differential pressure is generated between a windward ray of symmetry and a leeward ray of symmetry, and therefore the flows on the object surface are a combination of a flow in a circumferential direction (from the windward side to the leeward side) and a flow in an axial direction. In this case, the boundary layer flow also varies in the circumferential direction, excluding the windward and leeward rays of symmetry, and is therefore known as a three-dimensional boundary layer. It is known that in a three-dimensional boundary layer, the laminar-turbulent transition is governed by cross-flow instability.

Cross-flow instability has a greater destabilization effect than Tollmien-Schlichting wave type instability, and therefore, at an identical flow velocity, the transition location advances further toward a tip when the angle of attack is not zero than when the angle of attack is zero. Advancement of the transition location is greatest in a location where a circumferential angle is approximately 60 degrees from the leeward ray of symmetry (see Non-Patent Document 2, for example).

A nose of a small sized business jet aircraft developed by HONDA MOTOR CO., Ltd. is known as a natural laminar flow nose-shaped object placed in a fluid (see Patent Document 1 and Non-Patent Document 3, for example). This small sized business jet aircraft, however, is a subsonic aircraft with a maximum cruising speed of 778 km/h (216 m/s), or in other words M=0.73, at a maximum operating altitude of 12 km (−56° C.).

Peripheral flows differ greatly between cases in which the nose-shaped object is placed in a subsonic flow of M=0.73 and a supersonic flow of at least M=1.5. The reason for this is that in a supersonic flow, compressibility is strong, and in the supersonic flow, therefore, a shock wave forms on a tip of the nose-shaped object. Moreover, a pressure distribution over the object surface differs from that of the subsonic flow.

Hence, a mechanism of natural laminarization of boundary layer on a nose-shaped object differs depending on whether the object is placed in a subsonic flow or a supersonic flow. In other words, a specific natural laminar flow nose shape for suppressing the laminar-turbulent transition in a nose-shaped object of an aircraft placed in a supersonic flow by overcoming the instability described above has not yet been found.

Patent Document 1: U.S. Pat. No. 7,093,792
Non-Patent Document 1: Naoko Tokugawa, Dong-Youn Kwak, Kenji Yoshida, Yoshine Ueda: "Transition Measurement of Natural Laminar Flow Wing on Supersonic Experimental Airplane (NEXST-1)", Journal of Aircraft, Vol. 45, No. 5, (2008), pp. 1495-1504
Non-Patent Document 2: Yoshine Ueda, Hiroaki Ishikawa, Kenji Yoshida: "Three-Dimensional Boundary Layer Transition Analysis in Supersonic Flow Using a Navier-Stokes Code", ICAS2004-2.8.2 (2004)
Non-Patent Document 3: "Natural Laminar Flow Wing and Nose", Honda Aircraft Company in the U.S. [online], [retrieved Jun. 1, 2010], Internet <URL: http://hondajet.honda.com/designinnovations/naturalLaminarF low.aspx>

As described above, there are at present no precedents whatsoever natural laminarization of boundary layer on a nose of a supersonic aircraft by adjusting the shape of the nose while taking instability into consideration.

At the Japan Aerospace Exploration Agency (JAXA), for example, a silent supersonic aircraft (known as S3TD) is being designed to test an airframe design technique for reducing a sonic boom, but natural laminarization of boundary layer has not been implemented on the nose shape thereof. Hence, the present inventor investigated respective transition characteristics of the silent supersonic aircraft (known as S3TD) and four axial symmetrical shapes numerically as a preliminary to designing a natural laminar flow nose.

It was found as a result of a numerical investigation into the transition characteristic of a silent supersonic (known as 2.5 shape S3TD) that the pressure distribution (a streamline 172 in FIG. 38) in the vicinity of the windward ray of symmetry is undulating, and in accordance therewith, a cross-flow velocity direction (a streamline 172 in FIG. 39) reverses repeatedly while an amplitude of the cross-flow velocity remains low.

Results of a numerical analysis of the silent supersonic aircraft (known as S3TD) show that when the cross flow reverses repeatedly without developing in a single direction, amplification of the amplitude is suppressed. In other words, when the pressure distribution over the nose surface undulates, the cross-flow instability can be suppressed favorably such that the boundary layer transition on the nose surface can be delayed, or in other words the transition location can be delayed.

Further, it is evident from a pressure distribution shown by a streamline 116 in FIG. 38 that even through the pressure distribution undulates similarly to the streamline 172, the laminar-turbulent transition location (the boundary layer transition location) is closer to the tip than the streamline 172 (an N factor in FIG. 39).

Hence, by appropriately modifying the phase of the undulating pressure distribution, a natural laminar flow effect for reducing frictional drag by delaying the transition location and a separation suppression effect for suppressing separation by advancing the transition can be realized selectively on the nose surface.

In other words, with an undulating pressure distribution, both a natural laminar flow effect and a separation suppression effect of separation are obtained. It was therefore found that an undulating pressure distribution on the surface is extremely important for natural laminarization of boundary layer and suppressing separation on the nose.

DISCLOSURE OF THE INVENTION

The present invention has been designed on the basis of the knowledge described above, and an object thereof is to provide a nose for a supersonic flying object that flies at supersonic speed, which has a natural laminar flow nose shape capable of suppressing a laminar-turbulent transition and thereby greatly reducing frictional drag.

In a nose for a supersonic flying object described in claim 1, the problems described above are solved by providing the nose with a base shape that is approximately a cone shape having a linear, simple convex curved, or simple concave curved generatrix, and adding a deformation element having a wavy shape to the base shape.

In the nose for a supersonic flying object described in claim 2, the problems described above are solved by making the deformation element at least one of a sinusoidal deformation for deforming the base shape as a whole into a wavy shape in at least one of a circumferential direction and an axial direction, and a local wavy deformation for deforming a part of the base shape locally into a wavy shape.

In the nose for a supersonic flying object described in claim 3, the problems described above are solved by expressing the deformation element by $$dR(x, \phi) = W_x(x) \times \sum_{t=1}^{t_\infty} \{\Phi_t(\phi) \times \Psi_t(x, x_{0t}(\phi))\} \quad \text{[Equation 1]}$$

(where $\Phi(\phi)$ is a circumferential direction deformation component term, $\Psi(x, x_{0t}(\phi))$ is an axial direction deformation component term, x is an axial direction location from a tip, $\phi$ is a circumferential direction angle from a leeward ray of symmetry, L is an overall axial direction length, and $W_x(x)$ is a weighting function for ensuring zero deformation on respective axial direction ends (x=0 and x=L)).

Setting a sum between t=1 and t=∞ indicates that it is also possible to superpose a plurality of deformation component terms.

Further, any function in which $W_x(x=0)=W_x(x=L)=0$ may be used as the weighting function $W_x(x)$. For example, a hyperbolic function expressed by $$W_x(x) = W_x(x, x_w, w_x) \quad \text{[Equation 6]}$$

$$= \frac{\left[\tanh\left\{w_x \frac{(x-x_w)}{L}\right\} + \tanh\left\{w_x \frac{x_w}{L}\right\}\right] \times \left[\tanh\left\{w_x \frac{([L-x]-x_w)}{L}\right\} + \tanh\left\{w_x \frac{x_w}{L}\right\}\right]}{\left[\tanh\left\{w_x \frac{(L/2-x_w)}{L}\right\} + \tanh\left\{w_x \frac{x_w}{L}\right\}\right]^2}$$

is used.

In the nose for a supersonic flying object described in claim 4, the problems described above are solved by making the deformation element the sinusoidal deformation for deforming the base shape as a whole into a wavy shape in at least one of the circumferential direction and the axial direction, and expressing the circumferential direction deformation component term and the axial direction deformation component term by $$\Phi_t(\phi) = \sum_{j=0}^{\infty} D_j \times \cos\{k_j \times \phi + r_j(x/L)\} \quad \text{[Equation 2]}$$

$$\Psi_t(x, x_0 = 0) = \sum_{i=0}^{i_\infty} [B_i(x) \times \sin\{2\pi \times n_i \times (x/L) + \pi \times m_i\}] \quad \text{[Equation 3]}$$

(where $x_{0t}(\phi) = x_0 = 0$, and

D, k, r, B(x), n, and m are terms dependent on a circumferential direction amplitude, a circumferential direction wave number, a circumferential direction phase, an amplitude having x in the axial direction as a function, an axial direction wave number, and an axial direction phase, respectively).

Setting the sum between j=1 and j=∞ and setting the sum between i=1 and i=∞ in the respective equations indicates that the respective deformation component items may also be constituted separately by pluralities of superposed deformation components.

Further, since the axial direction deformation component is not dependent on the circumferential direction angle $\phi$, $x_{0t}(\phi)=x_0=0$, and $\phi$ does not exist on the right side.

In the nose for a supersonic flying object described in claim 5, the problems described above are solved by making the deformation element the local wavy deformation for deforming a part of the base shape locally into a wavy shape, and expressing the circumferential direction deformation component term and the axial direction deformation component term by $$\Phi_t(\phi) = \varepsilon_{0t} + E_{0t} \int_{-\infty}^{\infty} d\beta \cdot E_t(\beta) \cos(\beta\{\phi - \phi_{0t}\}) \quad \text{[Equation 4]}$$

-continued $$\Psi_t(x, x_0(\phi)) = F_{1t} \times \left(\left\{\tanh\left[\frac{(x - x_{0t}(\phi))}{L} \times F_{2t}\right] + 1\right\} \times \right.$$
$$\left.\left\{-\tanh\left[\frac{(x - x_{0t}(\phi))}{L} \times F_{2t}\right] + 1\right\} + F_{3t}\right) +$$
$$G_{0t}\int_{-\infty}^{\infty} d\alpha \cdot G_t(\alpha)\cos(2\pi\alpha\{x - x_{0t}(\phi)\}/L)$$

[Equation 5]

(where $\epsilon_{0t}$, $E_{0t}$, $E_t$ are respectively terms relating to a circumferential direction amplitude, $F_{1t}$, $F_{3t}$, $G_{0t}$, $G_t$ are respectively terms relating to an axial direction amplitude, $\alpha$, $F_{2t}$ are terms relating to an axial direction wave number, $\beta$ is a circumferential direction wave number, $\phi_{0t}$ is a circumferential direction deformation location, and $x_{0t}(\phi)$ is an arbitrary function relating to an axial direction deformation location).

A central location $x_{0t}(\phi)$ of the deformation is an arbitrary function, but a function such as $$x_{0t}(\phi) = x_{0t}(\phi, H_{1t}, H_{2t}, H_{3t})$$
$$= [\tanh\{(\phi - \pi/2) \times H_{1t}\}/H_{3t} + H_{2t}] \times L$$

[Equation 7]

may be used, for example.

In the nose for a supersonic flying object described in claim 6, the problems described above are solved by making the base shape a Sears-Haack body or a flared cone.

In the nose for a supersonic flying object described in claim 7, the problems described above are solved by disposing the nose in an airflow in an attitude having an angle of attack greater than 0°.

By adding the wavy-shaped deformation element to the base shape of the nose for a supersonic flying object according to claim 1, the undulating pressure distribution can be modified such that an axial direction pressure gradient increases, a circumferential direction pressure gradient decreases, or the axial direction pressure gradient increases and the circumferential direction pressure gradient decreases in combination. In so doing, amplification of the cross-flow velocity can be suppressed, thereby suppressing the laminar-turbulent transition on the nose surface such that the boundary layer transition location is delayed, and as a result, frictional drag on the nose surface can be greatly reduced.

The laminar-turbulent transition location of the boundary layer on the base shape can be estimated through experiment or simulation in accordance with conditions such as velocity, air pressure, and angle of attack, and by adding an optimum wavy-shaped deformation element corresponding to predetermined conditions, a maximum natural laminar flow effect can be expected.

According to the configuration described in claim 2, the deformation element can be formed in an optimum wavy shape in relation to either a pressure distribution that undulates over the entire circumferential direction or axial direction or a locally varying pressure distribution, and therefore the laminar-turbulent transition on the nose surface can be suppressed over a wider condition range. As a result, the boundary layer transition location can be delayed even further, enabling an even greater reduction in frictional drag on the nose surface.

According to the configurations described in claims 3 to 5, design values of optimum conditions can be determined numerically, and therefore a nose for a supersonic flying object having an optimally practical shape can be obtained.

According to the configuration described in claim 6, by employing a shape exhibiting a large natural laminar flow effect as the base shape, the undulating pressure distribution is small and easy to estimate. As a result, a shape to which an optimum wavy-shaped deformation element has been added can be obtained.

According to the configuration described in claim 7, by employing an optimum nose shape corresponding to the angle of attack, the design freedom of the nose for a supersonic flying object and structures in the vicinity thereof can be improved.

BRIEF DESCRIPTION OF THE DRAWINGS

FIG. 13 is an illustrative view showing the boundary layer transition characteristic on a side face of the natural laminar flow nose of FIG. 12;

FIG. 14 is an illustrative view showing main parts of a further example of the natural laminar flow nose according to the present invention;

EXPLANATION OF REFERENCE NUMERALS

Figure 1:
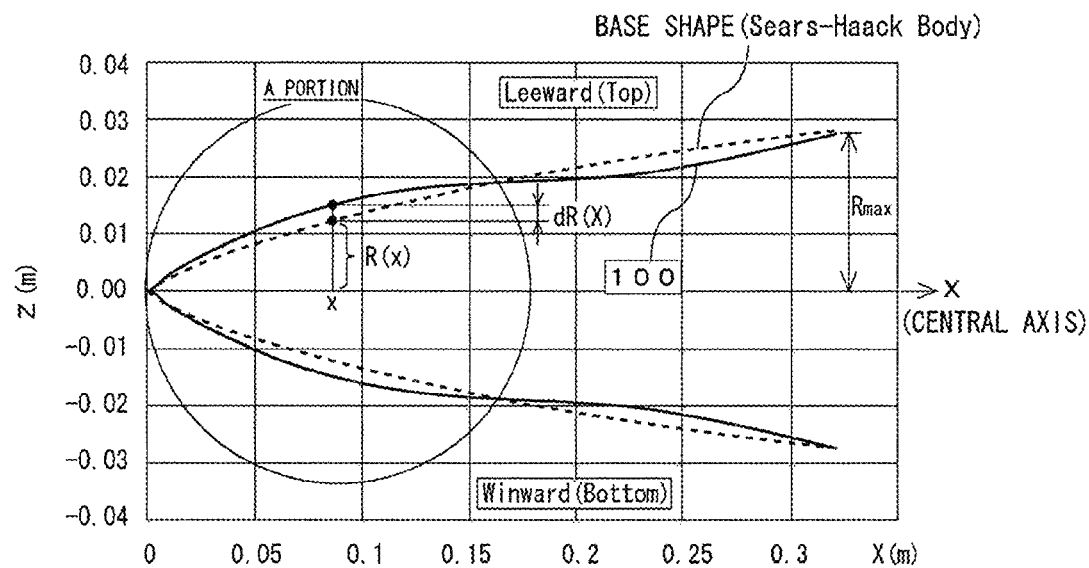
FIG. 1 is an illustrative view showing main parts of a natural laminar flow nose according to the present invention.

100, 200, 300, 400, 500, 600, 700, 800 natural laminar flow nose.

BEST MODE FOR CARRYING OUT THE INVENTION

The present invention will be described in further detail below using embodiments shown in the drawings.

FIG. 1 is an illustrative view showing main parts of a natural laminar flow nose 100 to which a sinusoidal deformation that is wavy-shaped in an axial direction has been added, serving as a nose for a supersonic flying object according to the present invention.

The natural laminar flow nose 100 has a Sears-Haack body (an S-H body) as a base shape, while an outer surface thereof has an undulating shape defined by a following Equation 1 in a central axis direction (an X axis direction).

Figure 2:
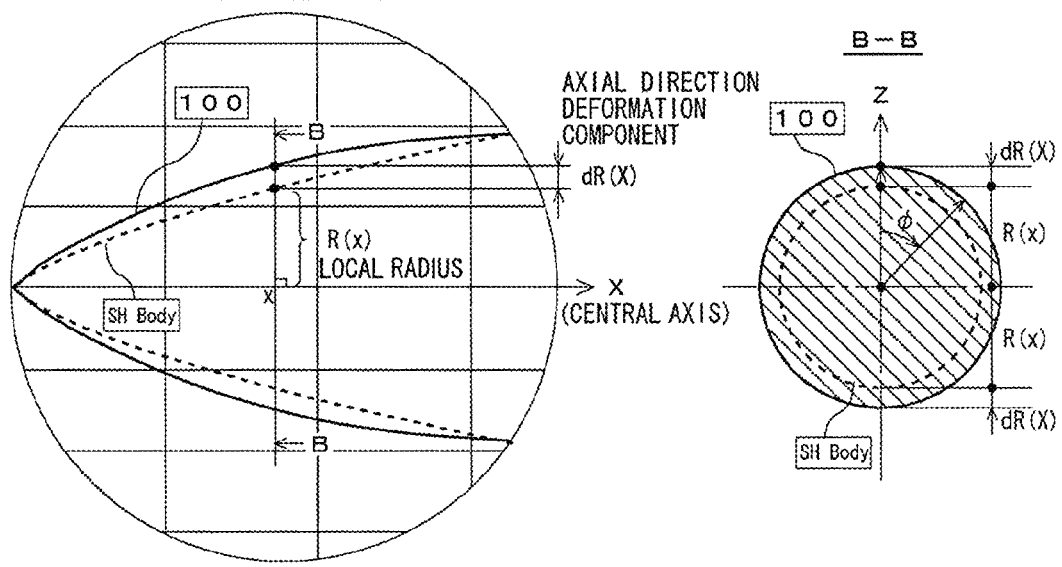
FIG. 2 is an illustrative view showing an A portion of FIG. 1.

As shown in FIG. 2, in the natural laminar flow nose 100, when an outer radius of the S-H body in a location (x) on the central axis of the S-H body is set as a local radius R(x), dR(x) defined in Equation 1 is added to the local radius R(x) in a corresponding local radius direction. In this embodiment, dR(x) defined in Equation 1, which is added in the local radius direction, will be referred to as a "deformation component relating to axial direction deformation".

$$dR(x) = B(x)\sin\{2\pi(x/L) \times n + \pi \times m\} \quad \text{[Equation 1]}$$

where an amplitude $B(x) \equiv R \times A(x) \times C(x)$

Here, a reference radius R is a maximum radius $R_{max}$ of a cross-section of the base shape or the local radius R(x) in the location (x) on the central axis. Further, an amplitude coefficient A(x) takes a value between 0.01 and 0.2. Furthermore, a weighting function C(x) is 1 in most cases.

L is an overall length in the central axis direction. Further, n denotes a wave number (a value divided by a single wavelength), and will be referred to here in particular as an "axial direction wave number". In the natural laminar flow nose 100, R(x)=the maximum radius $R_{max}$, the amplitude coefficient A=0.1, the weighting function C(x)=1, the overall axial direction length L=0.33 [m], and the axial direction wave number n=1.

Furthermore, m is a constant for determining a shape feature of a tip portion that dents or bulges relative to the base shape, and is set at m=0 or 1. Here in particular, m will be referred to as an "axial direction phase coefficient". When m=0, the tip portion bulges, and therefore the nose exhibits a natural laminar flow effect. When m=1, on the other hand, the tip portion dents, and therefore the nose exhibits a separation suppression effect. In the natural laminar flow nose 100 described above, incidentally, the axial direction phase coefficient m=0.

Further, the Sears-Haack body serving as the base shape has an axially symmetrical shape with which wave drag caused by a shock wave is minimized in a supersonic flow, and is employed as a nose part of the scaled supersonic experimental airplane (NEXST-1). The Sears-Haack body has a favorable pressure gradient (an acceleration pressure gradient) relative to the axial direction at an angle of attack α=0°, and a radius $R_{SH}(x)$ thereof is defined as follows.

$$R_{SH}(x)=A_0\,[(x/L_{SH})\{1-(x/L_{SH})\}]^{3/4} \quad \text{[Equation 2]}$$

where $L_{SH}=1.194938$ and $A_0=0.09657$.

Note that the values of $L_{SH}$ and $A_0$ are values taken when the overall axial direction length is L=0.33 [m]. Accordingly, when the overall axial direction length is modified to L', or in other words when $R_{SH}(x)$ as a whole is enlarged (or reduced) by a homothetic ratio h(=L'/L), the homothetic ratio h must be multiplied respectively by $L_{SH}=1.194938$ and $A_0=0.09657$, as shown in a following Equation 3, by replacing x with x/h and $R_{SH}$ with $R_{SH}/h$ in $R_{SH}(x)$. Hence, in the case of a natural laminar flow nose 200 to be described below, for example, the overall axial direction length L'=27.18 [m], and therefore $L_{SH}$ and $A_0$ in this case become $L_{SH}=98.41947$ and $A_0=7.954176$, which are obtained by multiplying a ratio (h)=27.18/0.33 of the overall length by each of the above values.

$$R_{SH}(x)/h=A_0\,[(x/h/L_{SH})\{1-(x/h/L_{SH})\}]^{3/4} \leftarrow\rightarrow R_{SH}(x)=(h\cdot A_0)[(x/(h\cdot L_{SH}))\{1-(x/(h\cdot L_{SH}))\}]^{3/4} \quad \text{[Equation 3]}$$

Incidentally, when the location (x) on the central axis is fixed, the amplitude B(x) within dR(x) remains constant in a circumferential direction (along circumferential angle φ: 0→2π). In other words, the in the natural laminar flow nose 100, deformation of the base shape in the circumferential direction about the central axis is not taken into consideration.

However, by adding wave-shaped sinusoidal deformation having the amplitude B(x) in the circumferential direction to the base shape in addition to wave-shaped sinusoidal deformation having the amplitude B(x) in the central axis direction, it may be possible to realize an undulating pressure distribution on the nose surface more easily, which is preferable from the viewpoint of the natural laminar flow effect and the separation suppression effect.

Hence, when wave-shaped sinusoidal deformation is added to the base shape in both the axial direction and the circumferential direction, a deformation component dR(x, φ) relating to the deformation can be defined by a following Equation 4.

$$dR(x,\varphi)=dR(x)\times D\times\cos\{k\times\varphi+r(x/L)\}=B(x)\sin\{2\pi(x/L)\times n+\pi\times m\}\times D\times\cos\{k\times\varphi+r(x/L)\} \quad \text{[Equation 4]}$$

Here, $D\times\cos\{k\times\varphi+r(x/L)\}$ will be referred to as a "deformation factor relating to the circumferential direction deformation". D is an amplitude, and φ is a circumferential angle based on an axis of symmetry (a Z axis in FIG. 2, for example). Further, k is a wave number relating to the circumferential direction, which will be referred to here in particular as a "circumferential direction wave number". Furthermore, r is a phase coefficient relating to the circumferential direction, which will be referred to here in particular as a "circumferential direction phase coefficient". Equation 4 expresses wave-shaped sinusoidal deformation having the amplitude B(x) in the circumferential direction in a case where the axial direction wave number n=0. Hence, Equation 4 expresses wave-shaped sinusoidal deformation having the amplitude B(x) in the X axis direction, wave-shaped sinusoidal deformation having the amplitude B(x) in the circumferential direction, or a combination of both.

The deformation dR(x, φ) for adding the axial direction wave-shaped sinusoidal deformation and the circumferential direction wave-shaped sinusoidal direction to the local radius R(x) is expressed by a single term in Equation 4. However, the deformation element may be added in a plurality, and in this case, the deformation element is defined by a sum of terms shown in a following Equation 5 rather than a single term.

$$dR(x,\varphi)=\Sigma_{j=1}\,[\Sigma_{i=1}\,\{B_i(X)\times\sin(\theta_i(x))\}]\times\{D_j\cos(\theta_j(\varphi,x))\}=[\Sigma_{i=1}\,\{B_i(X)\times\sin(\theta_i(x))\}]\times[\Sigma_{j=1}\,\{D_j\cos(\theta_j(\varphi,x))\}], \quad \text{[Equation 5]}$$

where $\theta_i(x)=\{2\pi(x/L)\times n_i+\pi\times m_i\}$, $\theta_j(\varphi,x)=\{k_j\times\varphi+r_j(x/L)\}$. In particular, $[\Sigma_{i=1}\,\{B_i(X)\times\sin(\theta_i(x))\}]$ will be referred to as a sum of the "deformation components relating to the axial direction deformation", while $[\Sigma_{j=1}\,\{D_j\cos(\theta_j(\varphi,x))\}]$ will be referred to as a sum of the "deformation factors relating to the circumferential direction deformation".

Note that characteristics of the respective coefficients are identical to those of the single term equation.

More specifically, when the axial direction wave number $n_i$ is not zero, the axial direction phase coefficient $m_i$ is fixed at 0 (zero) or 1 in order to fix the tip location. Here, a case in which the axial direction phase coefficient $m_i$ is zero indicates deformation that bulges beyond the base shape in the axial direction from the tip, while a case in which the axial direction phase coefficient $m_i$ is 1 indicates deformation that dents relative to the base shape in the axial direction from the tip.

Further, when the axial direction wave number $n_i$ is zero and the circumferential direction wave number $k_j$ is not zero, the axial direction phase coefficient $m_i$ is set at 0.5 or 1.5 so that an axial direction sinusoidal term has an absolute value of 1.

Furthermore, in a case where no deformation is applied in the circumferential direction, it has been confirmed that the natural laminar flow effect appears when the axial direction wave number $n_i$ is within a range of 0.5 to 3.5 and the axial direction phase coefficient $m_i$ is zero, or in other words the nose bulges beyond the base shape in the axial direction.

On the other hand, it has been confirmed that the separation suppression effect, rather than the natural laminar flow effect, appears strikingly when the axial direction phase coefficient $m_i$ is 1, or in other words when the nose dents relative to the base shape in the axial direction from the tip.

The deformation may be inclined relative to the axis, and therefore the circumferential direction phase coefficient $r_j$ is expressed by a product of [the deformation] and the weighting function of the axial direction location x/L. In contrast to the axial direction phase coefficient $m_i$, the circumferential direction phase coefficient $r_j$ does not have to be fixed at zero or π.

Figure 3:
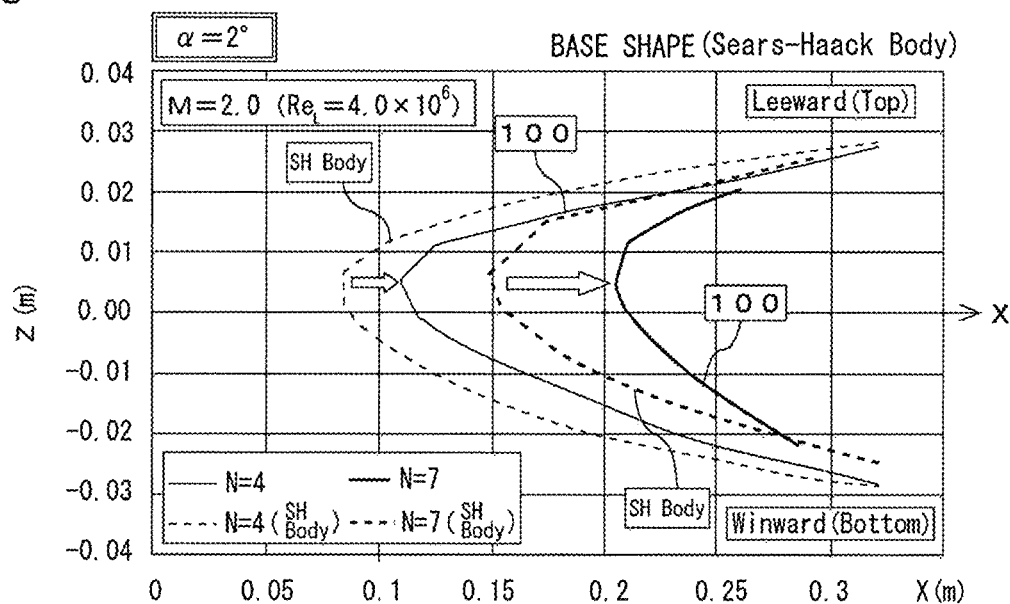
FIG. 3 is an illustrative view showing a boundary layer transition characteristic on a side face of the natural laminar flow nose at Mach 2 and a 2° angle of attack.
Figure 4:
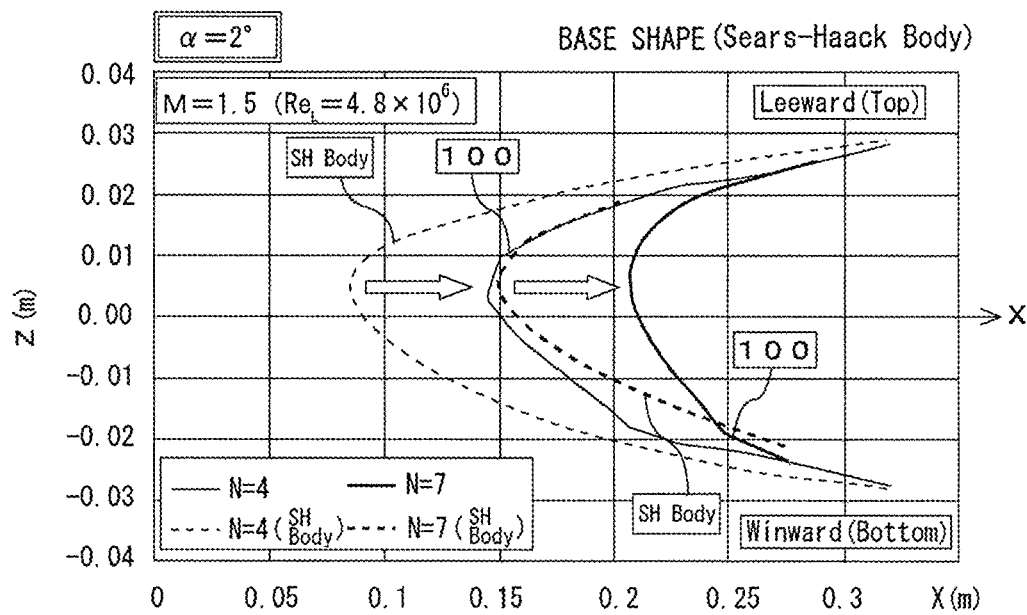
FIG. 4 is an illustrative view showing the boundary layer transition characteristic on the side face of the natural laminar flow nose at Mach 1.5 and a 2° angle of attack.
Figure 5:
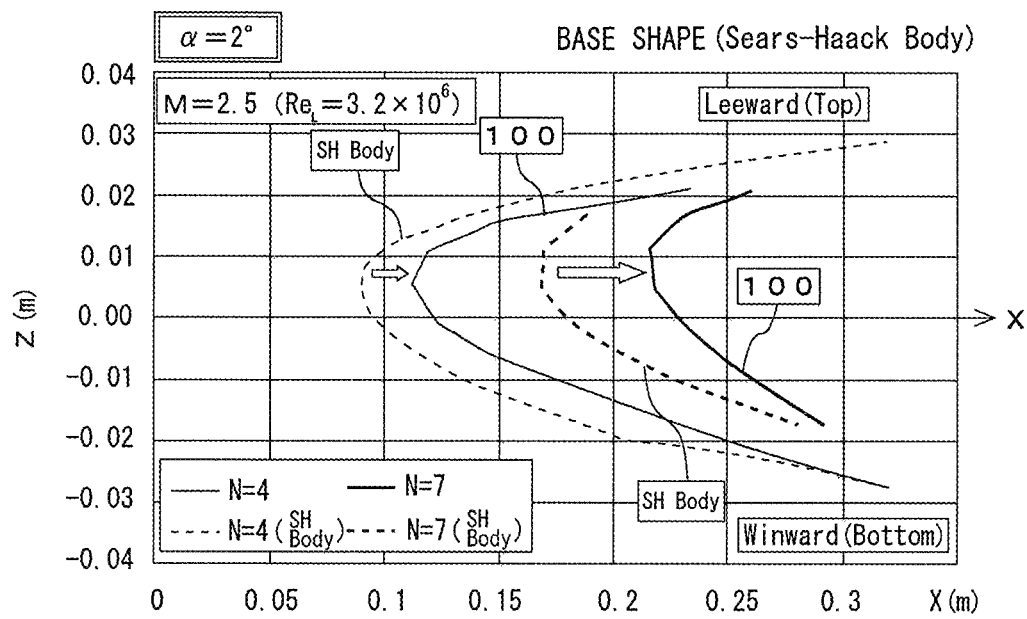
FIG. 5 is an illustrative view showing the boundary layer transition characteristic on the side face of the natural laminar flow nose at Mach 2.5 and a 2° angle of attack.

FIGS. 3 to 5 are illustrative views showing boundary layer transition characteristics pertaining to angles of attack and Mach numbers on a side face of the natural laminar flow nose 100. FIGS. 3, 4, and 5 show the boundary layer transition location on the side face of the natural laminar flow nose 100 when placed at an angle of attack α=2° in a Mach 2 airflow (Reynolds number $R_{eL}$ based on overall length=$4.0\times10^6$), a Mach 1.5 airflow ($R_{eL}=4.8\times10^6$), and a Mach 2.5 airflow ($R_{eL}=3.2\times10^6$), respectively.

Here, a performance of each shape was evaluated by comparing a numerically estimated transition location with the transition location of the axially symmetrical shape serving as the base shape.

Procedures for predicting the transition location numerically are as follows.
1. The surface shape is determined.
2. The surface shape is expressed in the form of a numerical grid (a calculation grid). Further, a spatial grid of an outer side of the surface is generated to analyze peripheral flows. A calculation grid for an axially symmetrical shape is generated using an automatic grid generation program "createGrid" developed by JAXA, while a calculation grid for a non-axially symmetrical shape is generated using an automatic grid generation program "NOAG", likewise developed by JAXA. Further, commercially available software "GRIDGEN" is used to generate a low boom shape grid. The grid has approximately 4.5 million points, and a minimum grid width corresponds to 0.01 $(R_e)^{0.5}$.

3. A three-dimensional Navier-Stokes equation, which is a governing equation of a fluid, is solved numerically. This numerical analysis is known as Computational Fluid Dynamics (CFD). It is assumed as a condition for performing CFD analysis that all flows on the object surface are laminar. A "multi-block structured grid solver UPACS (Unified Platform for Aerospace Computational Simulation)" developed by JAXA is used as a solver. In the numerical calculation performed during the UPACS, discretization is performed using a cell-centered finite volume method. Further, a convection term is calculated using a Roe scheme, and accuracy is increased by MUSCL second order accuracy.

4. A stability of a boundary layer distribution calculated by CFD analysis is analyzed numerically on the basis of a compressible linear stability theory, and a local amplification factor of an obtained disturbance is spatially integrated. An eN method, which is used most widely, is used in this transition analysis. An eN code (known as LSTAB) developed by JAXA is used as a code.

Further, a boundary layer transition location in an identical site of the S-H body serving as the base shape was obtained under identical conditions as a comparison subject. In this embodiment, N=7 was used as an N value (a threshold for determining the boundary layer transition location) of the eN method.

It was found as a result that on the side face of the natural laminar flow nose 100 according to the present invention, the boundary layer transition location was greatly delayed relative to the boundary layer transition location of the S-H body serving as the base shape.

Further, when the boundary layer transition location was predicted using N=4 as the threshold for reference purposes, it was confirmed similarly that in the natural laminar flow nose 100, the boundary layer transition location was greatly delayed relative to that of the S-H body serving as the base shape.

For reference purposes only, a transition suppression mechanism is estimated as follows in the natural laminar flow nose 100 having the largest natural laminar flow effect.

1. On the tip side, the cross-section is deformed to bulge beyond the base shape (dR(x)>0), while on an opposing rear end side, the cross-section is conversely deformed to dent relative to the base shape (dR(x)<0). As a result, a surface pressure undulates and the axial direction pressure gradient approximately doubles in comparison with the axial direction pressure gradient prior to the deformation.

2. A differential pressure between a windward side and a leeward side is reduced by reversing a direction of the pressure gradient. In other words, the circumferential direction pressure gradient decreases.

3. As a result, a pressure gradient in an orthogonal direction to a streamline decreases relative to a pressure gradient in a parallel direction to the streamline such that the cross-flow velocity is kept low.

4. By keeping the cross-flow velocity low, transition is suppressed. In other words, the natural laminar flow effect is obtained.

Figure 6:
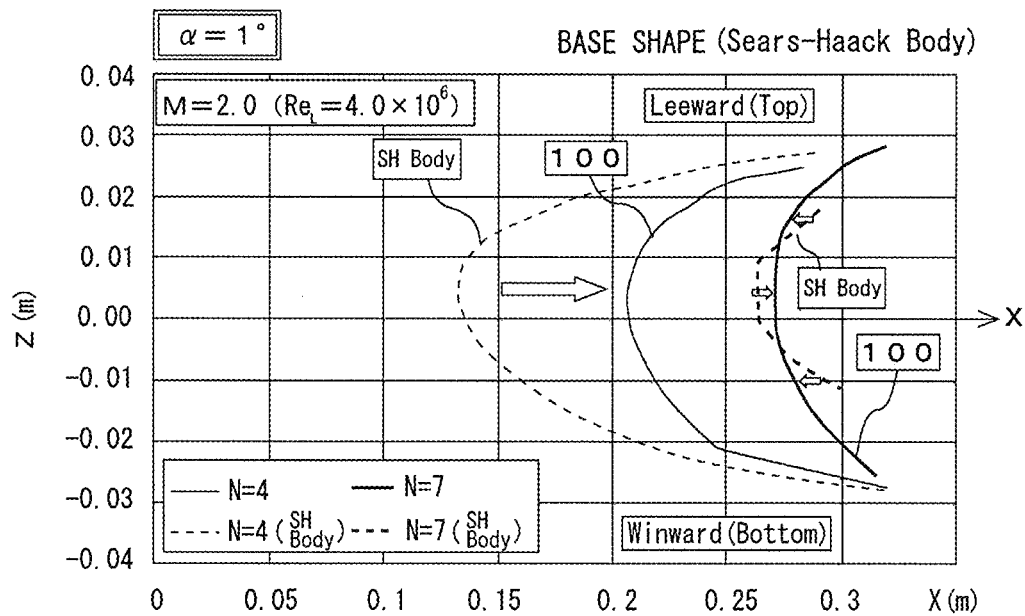
FIG. 6 is an illustrative view showing the boundary layer transition characteristic on the side face of the natural laminar flow nose at a 1° angle of attack.
Figure 7:
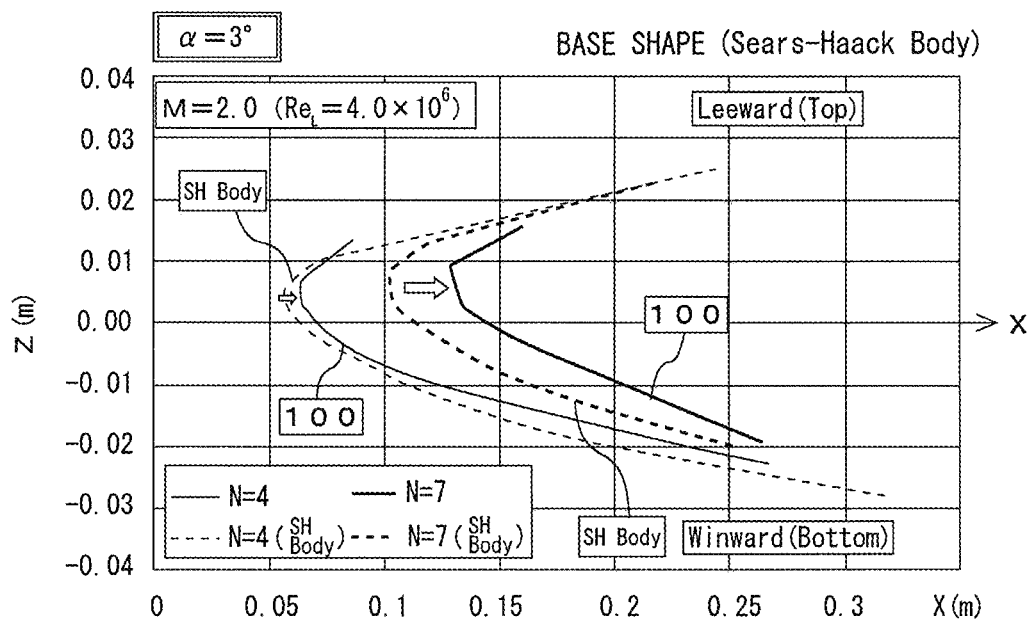
FIG. 7 is an illustrative view showing the boundary layer transition characteristic on the side face of the natural laminar flow nose at a 3° angle of attack.

FIGS. 6 and 7 are illustrative views showing boundary layer transition characteristics pertaining to angles of attack of the natural laminar flow nose 100. FIGS. 6 and 7 show the boundary layer transition location on the side face of the natural laminar flow nose 100 when placed in a Mach 2 airflow at an angle of attack α=1° and an angle of attack α=3°, respectively.

It was found as a result that when the angle of attack α=1°, the boundary layer transition location having N=7 as the threshold is delayed from the base shape only in the vicinity of Z=0 [m], while in a location where an absolute value of Z is large, the boundary layer transition location conversely advances relative to the base shape, leading to a reduction in the natural laminar flow effect.

Meanwhile, it was found that the boundary layer transition location having N=4 as the threshold is delayed greatly as a whole from the base shape.

When the angle of attack α=3°, on the other hand, it was found that the boundary layer transition location having N=7 as the threshold is as a whole delayed from the base shape such that a large natural laminar flow effect is obtained. However, it was also found that the boundary layer transition location as a whole is close to the tip, and therefore the amount of delay from the base shape is smaller than when the angle of attack α=2° (FIG. 3).

Figure 8:
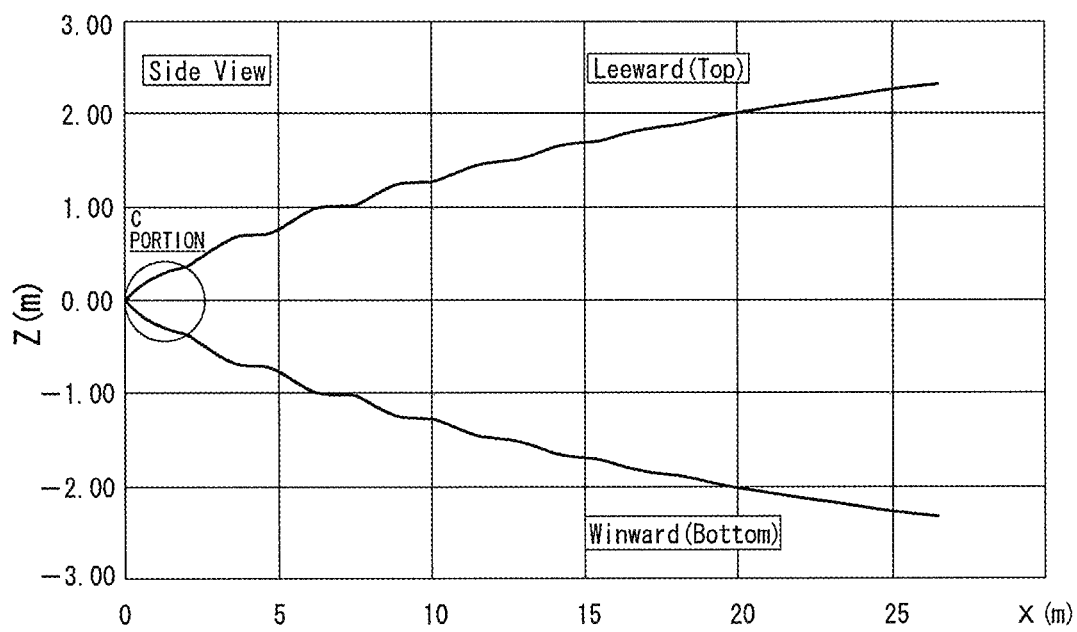
FIG. 8 is an illustrative view showing main parts of another example of the natural laminar flow nose according to the present invention.

FIG. 8 is an illustrative view showing main parts of a natural laminar flow nose 200 according to the present invention.

The natural laminar flow nose 200 has an S-H body in which $L_{SH}$=98.41947 and $A_0$=7.954176 in Equation 4 as a base shape, while in Equation 3, the axial direction wave number n is set at 10, the overall axial direction length L is set at 27.18 m, and the weighting function $C(x)=(1-x/L)^3$. In other words, the nose is shaped such that an amplitude $B(x)=R_{max} \times A(x) \times (1-x/L)^3$ varies periodically in the X axis direction (the central axis direction).

Figure 9:
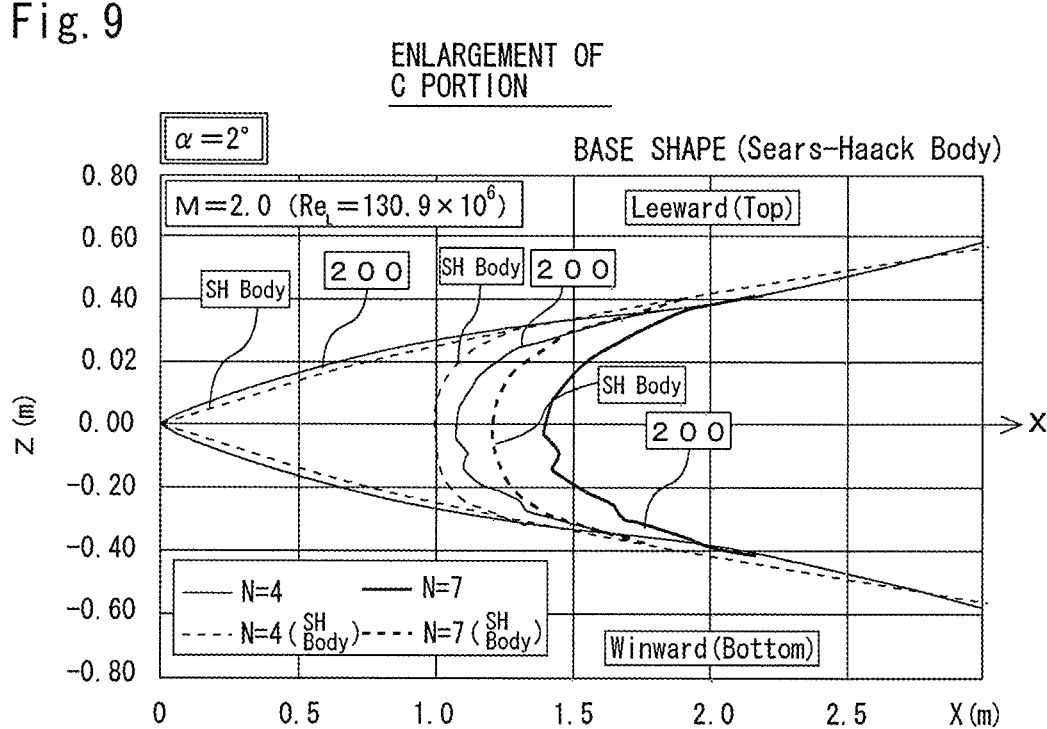
FIG. 9 is an illustrative view showing the boundary layer transition characteristic on a side face of the natural laminar flow nose of FIG. 8 at Mach 2 and a 2° angle of attack.

FIG. 9 is an illustrative view showing the boundary layer transition characteristic on a side face of the natural laminar flow nose 200 in a C portion of FIG. 8.

The figure shows the boundary layer transition location on the side face of the natural laminar flow nose 200 when placed at an angle of attack α=2° in an identical Mach 2 airflow to FIG. 3 (Reynolds number $R_{eL}$ based on overall axial direction length $L=130.9 \times 10^6$).

It was found as a result that the boundary layer transition location having N=7 as the threshold is delayed from the base shape. More particularly, when $R_{eL}=4.0 \times 10^6$ in FIG. 3, delay of the transition location from the base shape was approximately 0.02 m, but with the natural laminar flow nose 200, delay from the base shape is approximately 0.2 m, and therefore the natural laminar flow nose 200 exhibits a natural laminar flow effect that is approximately ten times greater than that of the natural laminar flow nose 100. In other words, it was found that by increasing the axial direction wave number n, increasing the overall axial direction length L, and setting a weighting $(1-x/L)^3 (=C(x))$ that is appropriate for the amplitude B(x), the boundary layer transition location can be delayed further.

Figure 10:
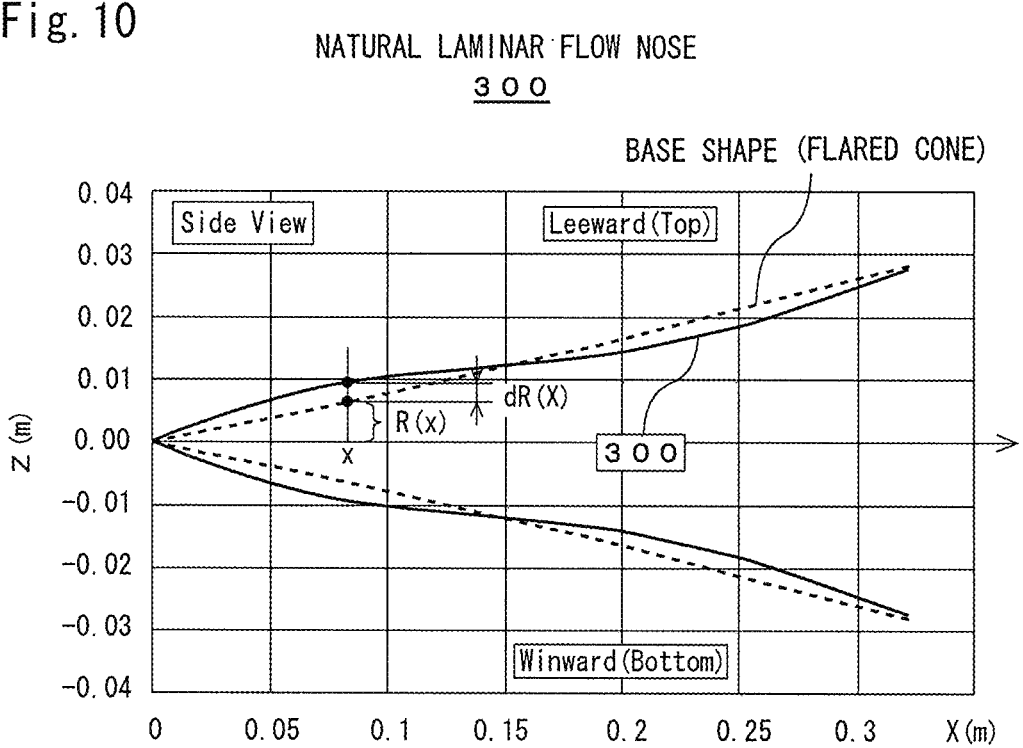
FIG. 10 is an illustrative view showing main parts of a further example of the natural laminar flow nose according to the present invention.

FIG. 10 is an illustrative view showing main parts of a natural laminar flow nose 300 according to the present invention.

The natural laminar flow nose 300 has a flared cone (an FC body) defined by a following Equation 7 as the base shape, while an outer surface thereof takes the undulating shape defined by Equation 1.

In other words, in the natural laminar flow nose 300, when an outer radius of the FC body in a location (x) on a central axis of the FC body is set as the local radius R(x), the deformation component dR(x) defined in Equation 1 is added to the local radius R(x) in the corresponding local radius direction.

The flared cone serving as the base shape is typically a shape having a diameter that increases at least linearly relative to the axial direction, and is defined by a following equation, for example. This shape features a reverse pressure gradient in the axial direction.

$$R_{FC}(X) = -1.0478 \times 10^{-9} X^4 + 6.9293 \times 10^{-7} X^3 - 6.1497 \times 10^{-5} X^2 + 6.9980 \times 10^{-2} X - 6.2485 \times 10^{-4}$$ [Equation 6]

Figure 11:
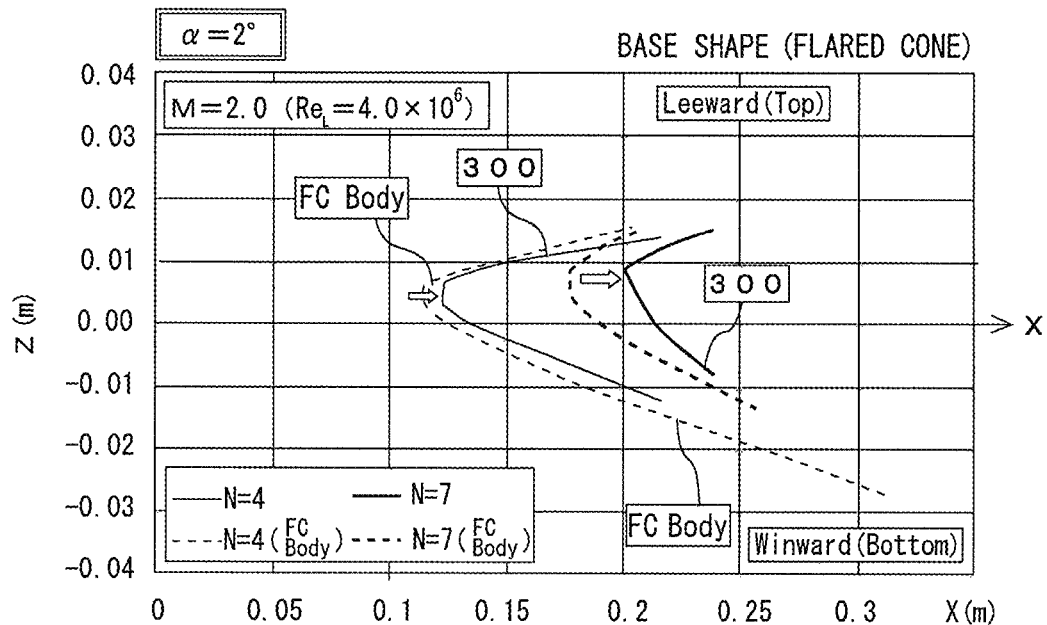
FIG. 11 is an illustrative view showing the boundary layer transition characteristic on a side face of the natural laminar flow nose of FIG. 10 at Mach 2 and a 2° angle of attack.

FIG. 11 is an illustrative view showing the boundary layer transition characteristic on a side face of the natural laminar flow nose 300.

The figure shows the boundary layer transition location on the side face of the natural laminar flow nose 300 when placed at an angle of attack $\alpha=2°$ in a Mach 2 airflow (Reynolds number $R_{eL}$ based on overall axial direction length $L=4.0 \times 10^6$).

It was found as a result that the boundary layer transition location having N=7 as the threshold is delayed from the base shape as a whole, and therefore that a large natural laminar flow effect is obtained. It was also found, however, that the delay amount is smaller than the delay amount obtained when an S-H body serves as the base shape (FIG. 3).

Figure 12:
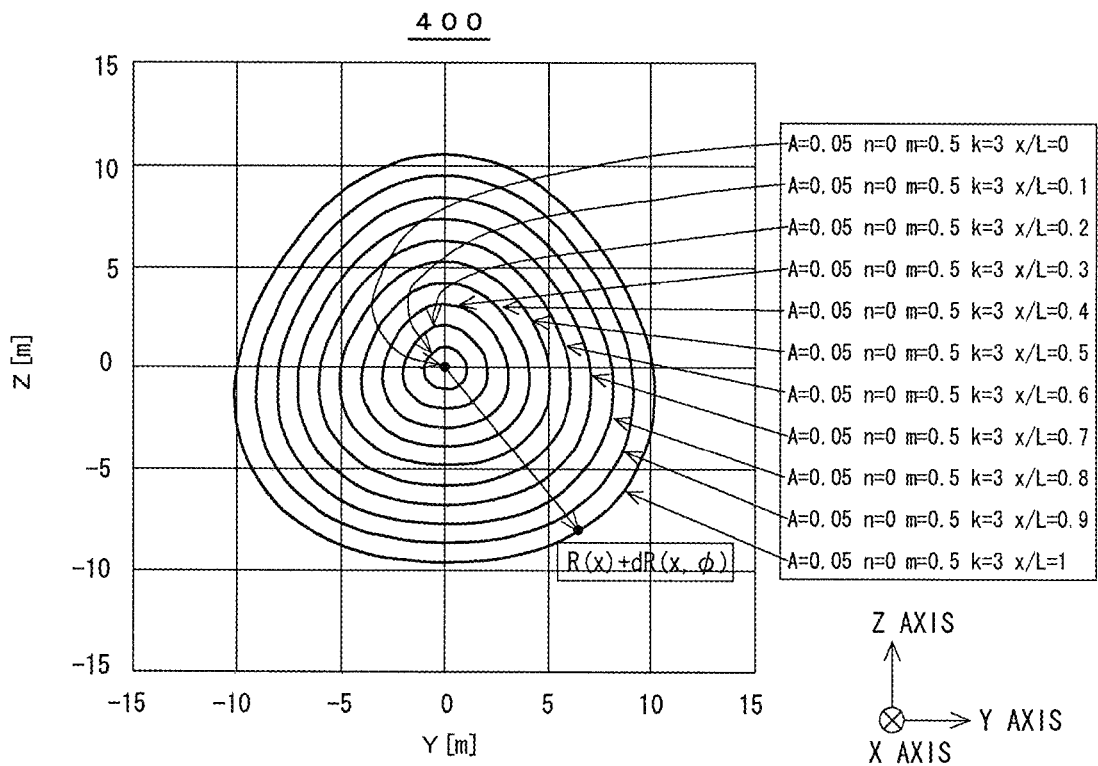
FIG. 12 is an illustrative view showing main parts of a further example of the natural laminar flow nose according to the present invention.

FIG. 12 is an illustrative view showing main parts of a natural laminar flow nose 400 according to the present invention. This figure is an illustrative view on which cross-sections at respective points on the X axis of the natural laminar flow nose 400 are superposed.

Similarly to the natural laminar flow noses 100, 200 described above, the natural laminar flow nose 400 has an S-H body as the base shape. As regards the deformation applied to the base shape, only wave-shaped sinusoidal deformation in a circumferential direction about the X axis is implemented on an outer peripheral surface of the S-H body, and wave-shaped sinusoidal deformation is not implemented in the axial direction (the X axis direction).

In other words, in Equation 5, the axial direction wave number relating to the wave-shaped sinusoidal deformation in the axial direction is set at n=0 and the axial direction phase coefficient is set at m=0.5 such that wave-shaped deformation having the amplitude B(x) is not applied in the X axis direction, whereupon the circumferential direction wave number is set at k=3 and the circumferential direction phase coefficient is set at r=0 such that wave-shaped sinusoidal deformation having the amplitude B(x) is applied in the circumferential direction about the X axis ($\phi$: $0 \to 2\pi$).

FIG. 13 is an illustrative view showing the boundary layer transition characteristic on a side face of the natural laminar flow nose 400 according to the present invention.

The figure shows the boundary layer transition location on the side face of the natural laminar flow nose 400 when placed at an angle of attack $\alpha=2°$ in an identical Mach 2 airflow to that of FIG. 3 (Reynolds number $R_{eL}$ based on overall axial direction length $L=4.0 \times 10^6$).

It was found as a result that the boundary layer transition locations having N=7 and N=4 as the threshold are delayed from the base shape, albeit by a delay amount not larger than that of the natural laminar flow nose 100.

FIG. 14 is an illustrative view showing main parts of a natural laminar flow nose 500 according to the present invention.

In the natural laminar flow nose 500, axial direction wave-shaped sinusoidal deformation consisting of the sum of two "deformation components relating to axial direction deformation" is applied to the outer peripheral surface of the S-H body.

In other words, in Equation 5, an amplitude of the circumferential direction deformation is set at $D_1=1$ and $D_j=0$ ($j \geq 2$), the circumferential direction wave number is set at $k_j=0$, and the circumferential direction phase coefficient is set at $r_j=0$ such that a sum of the "deformation factors relating to circumferential direction deformation" is 1, whereupon the sum of the "deformation components relating to axial direction deformation", in which the amplitude $B_1(x)=R_{max} \times A_1 \times C_1(x)=R_{max} \times 0.033 \times 1.0$, the amplitude $B_2(x)=R_{max} \times A_2 \times C_2(x)=R_{max} \times 0.0066 \times 1.0$, the axial direction wave number $n_1=1$, $n_2=2$, and the axial direction phase coefficient $m_1=0$, $m_2=0$, is added to the local radius direction of the S-H body such that the outer peripheral surface of the S-H body undergoes wave-shaped sinusoidal deformation in the axial direction.

Figure 15:
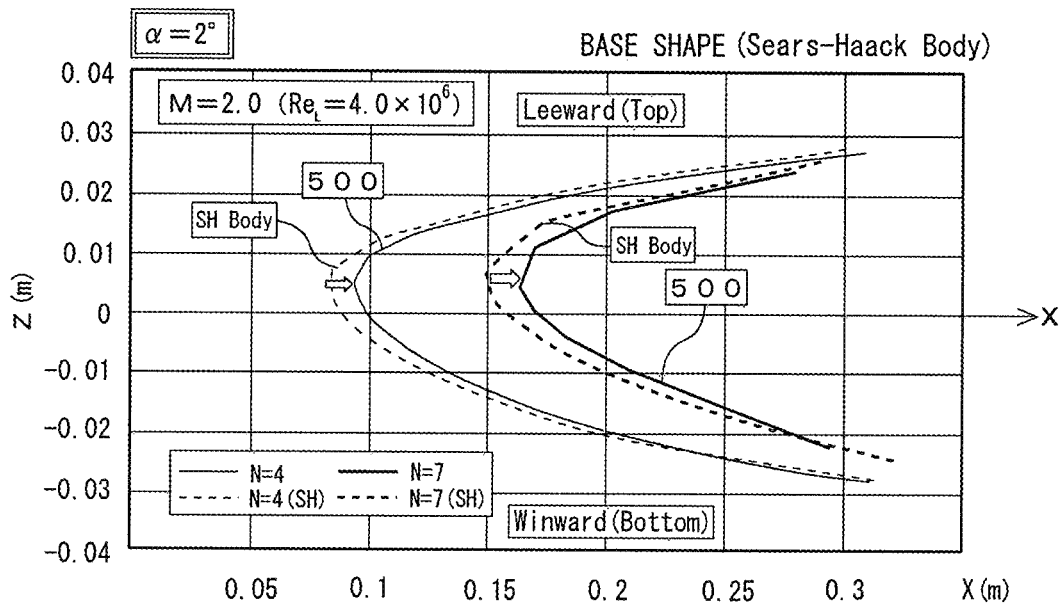
FIG. 15 is an illustrative view showing the boundary layer transition characteristic on a side face of the natural laminar flow nose of FIG. 14.

FIG. 15 is an illustrative view showing the boundary layer transition characteristic on a side face of the natural laminar flow nose 500 according to the present invention.

FIG. 15 shows the boundary layer transition location on the side face of the natural laminar flow nose 500 when placed at an angle of attack $\alpha=2°$ in an identical Mach 2 airflow to that of FIG. 3 (Reynolds number $R_{eL}$ based on overall axial direction length $L=4.0 \times 10^6$).

It was found as a result that the boundary layer transition locations having N=7 and N=4 as the threshold are delayed from the base shape, albeit by a delay amount not larger than that of the natural laminar flow nose 100.

Figure 16:
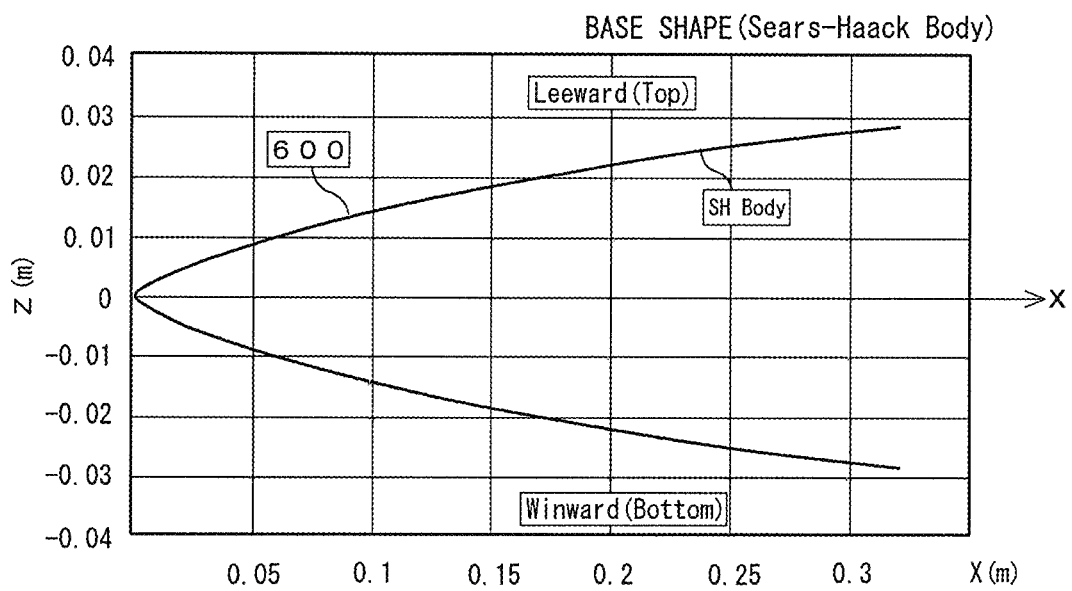
FIG. 16 is an illustrative view showing main parts of a further example of the natural laminar flow nose according to the present invention.

FIG. 16 is an illustrative view showing main parts of a natural laminar flow nose 600 according to the present invention.

In the natural laminar flow nose 600, a combination of an axial direction wave-shaped sinusoidal deformation and a circumferential direction wave-shaped sinusoidal deformation consisting of a product (multiplication) of the sum of two "deformation components relating to axial direction deformation" and a single "deformation factor relating to circumferential direction deformation" is applied to the outer peripheral surface of the S-H body.

In other words, in Equation 5, the product of the sum of two "deformation components relating to axial direction deformation" in which the amplitude $B_1(x)=R_{max} \times A_1 \times C_1(x)=R_{max} \times 0.033 \times 1.0$, the amplitude $B_2(x)=R_{max} \times A_2 \times C_2(x)=R_{max} \times 0.0066 \times 1.0$, the axial direction wave number $n_1=1$, $n_2=2$, and the axial direction phase coefficient $m_1=0$, $m_2=0$ and a "deformation factor relating to circumferential direction deformation" in which the amplitude $D_1=0.1$ and $D_j=0$ ($j \geq 2$), the circumferential direction wave number $k_1=2$, and the circumferential direction phase coefficient $r_1=0$ is added to the local radius direction of the S-H body such that the outer peripheral surface of the S-H body undergoes wave-shaped sinusoidal deformation in the axial direction.

Note that since the degree of deformation on the S-H body serving as the base shape of the natural laminar flow nose 600 is small, the natural laminar flow nose 600 and the S-H body substantially overlap in the figure.

Figure 17:
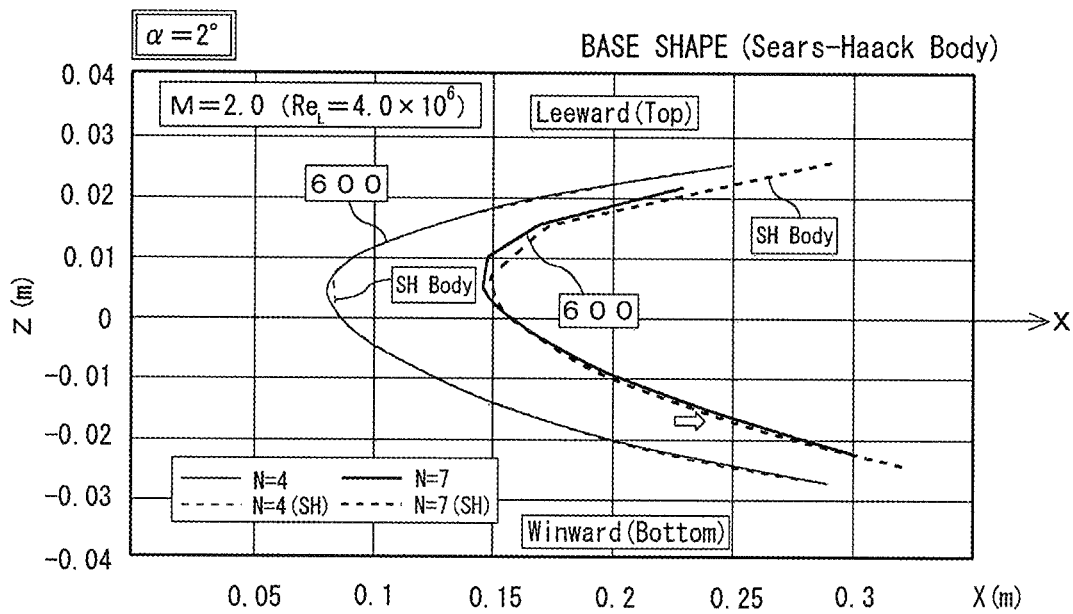
FIG. 17 is an illustrative view showing the boundary layer transition characteristic on a side face of the natural laminar flow nose of FIG. 16.

FIG. 17 is an illustrative view showing the boundary layer transition characteristic on a side face of the natural laminar flow nose 600 according to the present invention.

The figure shows the boundary layer transition location on the side face of the natural laminar flow nose 600 when placed at an angle of attack $\alpha=2°$ in an identical Mach 2 airflow to that of FIG. 3 (Reynolds number $R_{eL}$ based on overall axial direction length $L=4.0\times10^6$).

Although the boundary layer transition locations having N=7 and N=4 as the threshold are delayed by an extremely small amount, the natural laminar flow effect can be confirmed in the vicinity of a windward ray of symmetry.

Figure 18:
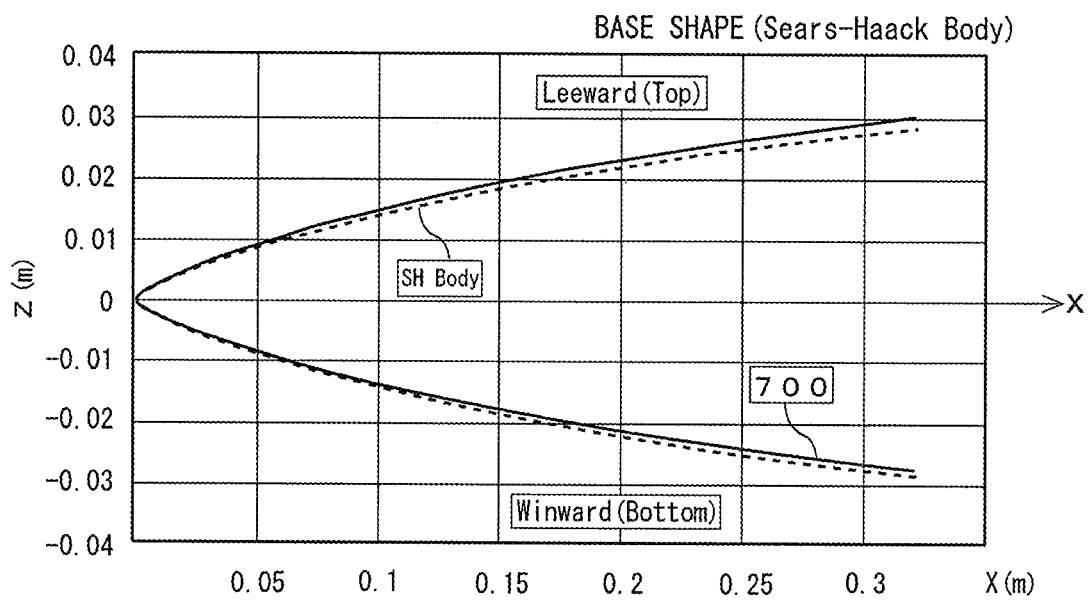
FIG. 18 is an illustrative view showing main parts of a further example of the natural laminar flow nose according to the present invention.
Figure 19:
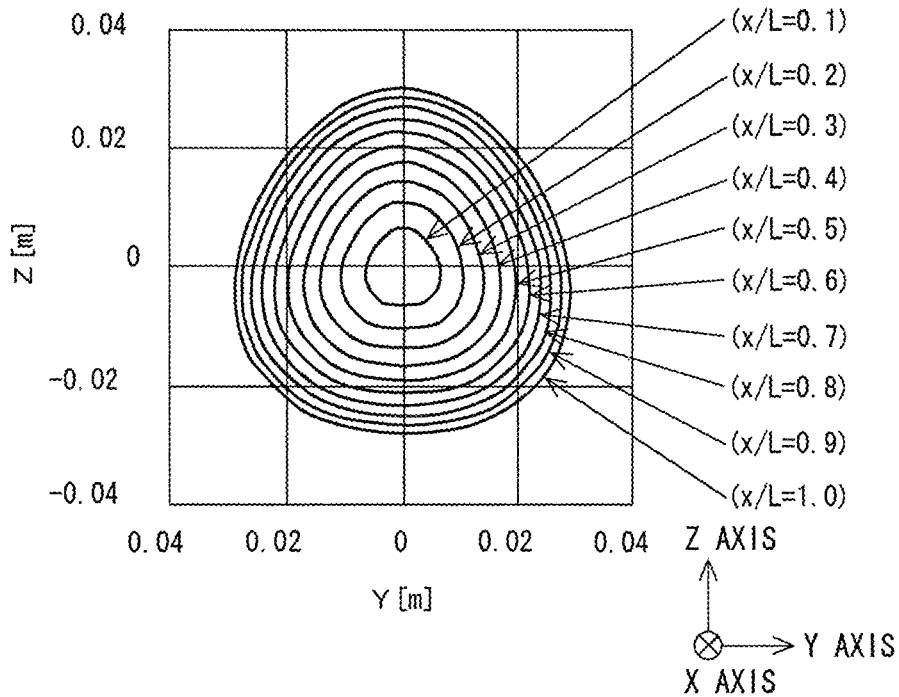
FIG. 19 is an illustrative view on which cross-sections at respective points on an X axis of the natural laminar flow nose of FIG. 18 are superposed.

FIG. 18 is an illustrative view showing main parts of a natural laminar flow nose 700 according to the present invention. Further, FIG. 19 is an illustrative view on which cross-sections at respective points on an X axis of the natural laminar flow nose 700 are superposed.

In the natural laminar flow nose 700, a circumferential direction wave-shaped sinusoidal deformation consisting of the sum of two "deformation factors relating to circumferential direction deformation" is applied to the outer peripheral surface of the S-H body.

In other words, Equation 6 is set such that the amplitude $B_1(x)=R(x)\times A_1\times C_1(x)=R(x)\times 0.05\times 1.0$, the amplitude $B_i(x)=0(i\geq 2)$, the axial direction wave number $n_1=0$, and the axial direction phase coefficient $m_1=0.5$, whereby the sum of the "deformation components relating to axial direction deformation" is $B_1(x)$, whereupon the sum of two "deformation factors relating to circumferential direction deformation" in which the amplitude $D_1=1.0$ and $D_2=0.2$, $D_j=0$ ($j\geq 3$), the circumferential direction wave number $k_1=3$ and the circumferential direction wave number $k_2=2$, and the circumferential direction phase coefficient $r_j=0$ is added to the local radius direction of the S-H body such that the outer peripheral surface of the S-H body undergoes wave-shaped sinusoidal deformation in the axial direction.

Figure 20:
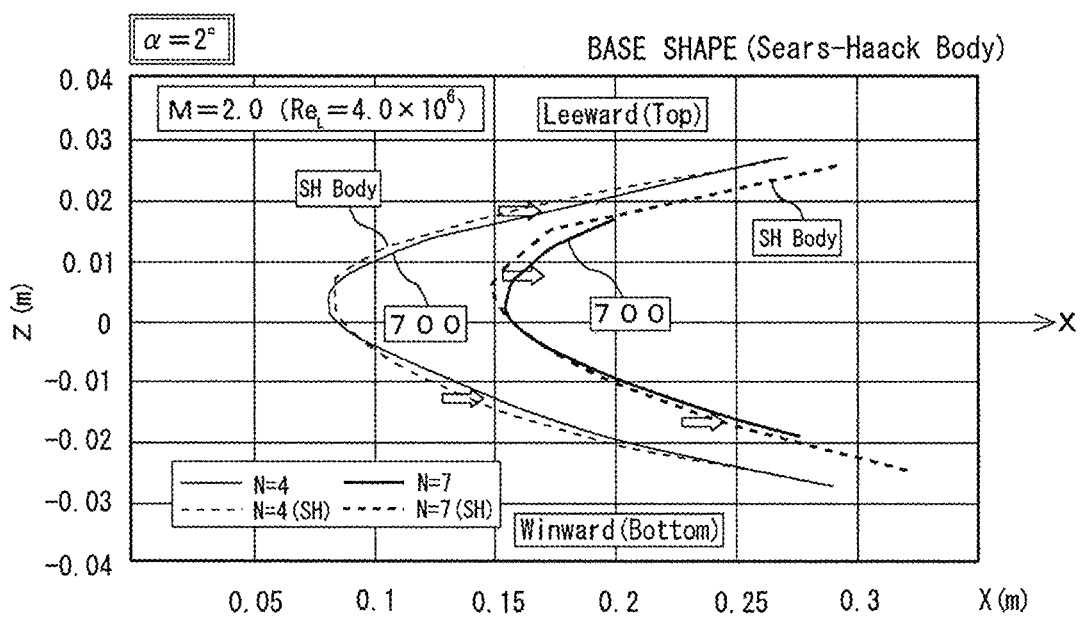
FIG. 20 is an illustrative view showing the boundary layer transition characteristic on a side face of the natural laminar flow nose of FIG. 18.

FIG. 20 is an illustrative view showing the boundary layer transition characteristic on a side face of the natural laminar flow nose 700 according to the present invention.

The figure shows the boundary layer transition location on the side face of the natural laminar flow nose 700 when placed at an angle of attack $\alpha=2°$ in an identical Mach 2 airflow to that of FIG. 3 (Reynolds number $R_{eL}$ based on overall axial direction length $L=4.0\times10^6$).

It was found as a result that the boundary layer transition locations having N=7 and N=4 as the threshold are delayed from the base shape, albeit by a delay amount not larger than that of the natural laminar flow nose 100.

Figure 21:
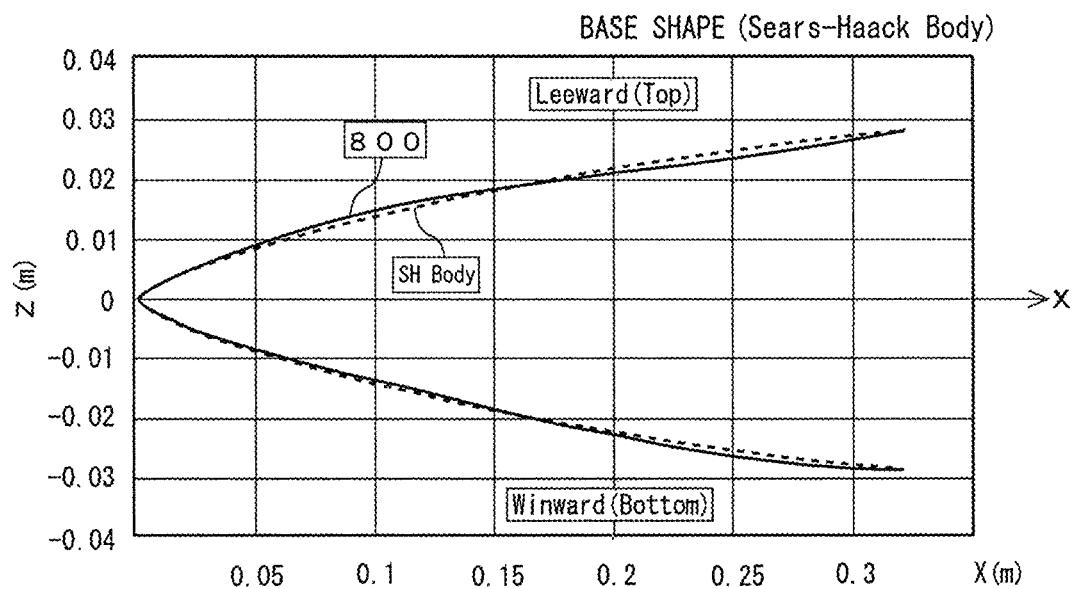
FIG. 21 is an illustrative view showing main parts of a further example of the natural laminar flow nose according to the present invention.
Figure 22:
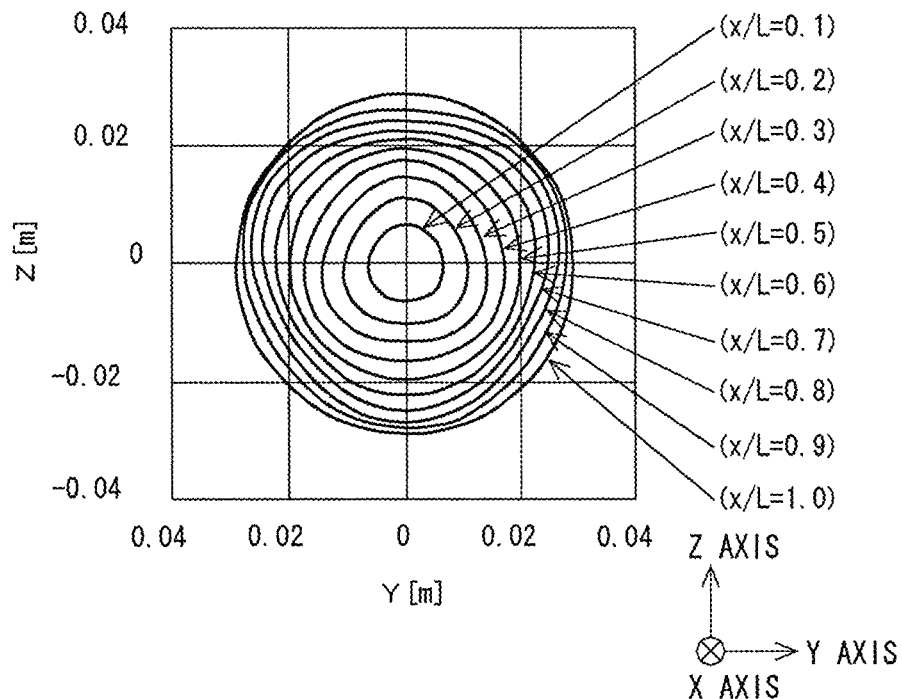
FIG. 22 is an illustrative view on which cross-sections at respective points on the X axis of the natural laminar flow nose of FIG. 21 are superposed.

FIG. 21 is an illustrative view showing main parts of a natural laminar flow nose 800 according to the present invention. Further, FIG. 22 is an illustrative view on which cross-sections at respective points on an X axis of the natural laminar flow nose 800 are superposed.

In the natural laminar flow nose 800, a combination of an "axial direction deformation" and a "circumferential direction deformation" consisting of a product (multiplication) of the sum of a single "deformation component relating to axial direction deformation" and two "deformation factors relating to circumferential direction deformation" is applied to the outer peripheral surface of the S-H body.

In other words, in Equation 6, the product of a "deformation component relating to axial direction deformation" in which the amplitude $B_1(x)=R(x)\times A_1\times C_1(x)=R(x)\times 0.05\times 1.0$, the amplitude $B_i(x)=0(i\geq 2)$, the axial direction wave number $n_1=1$, and the axial direction phase coefficient $m_1=0.0$ and the sum of two "deformation factors relating to circumferential direction deformation" in which the amplitude $D_1=1.0$ and $D_2=0.2$, $D_j=0$ ($j\geq 3$), the circumferential direction wave number $k_1=3$ and the circumferential direction wave number $k_2=2$, and the circumferential direction phase coefficient $r_j=0$ is added to the local radius direction of the S-H body such that the outer peripheral surface of the S-H body undergoes wave-shaped sinusoidal deformation in the axial direction.

Figure 23:
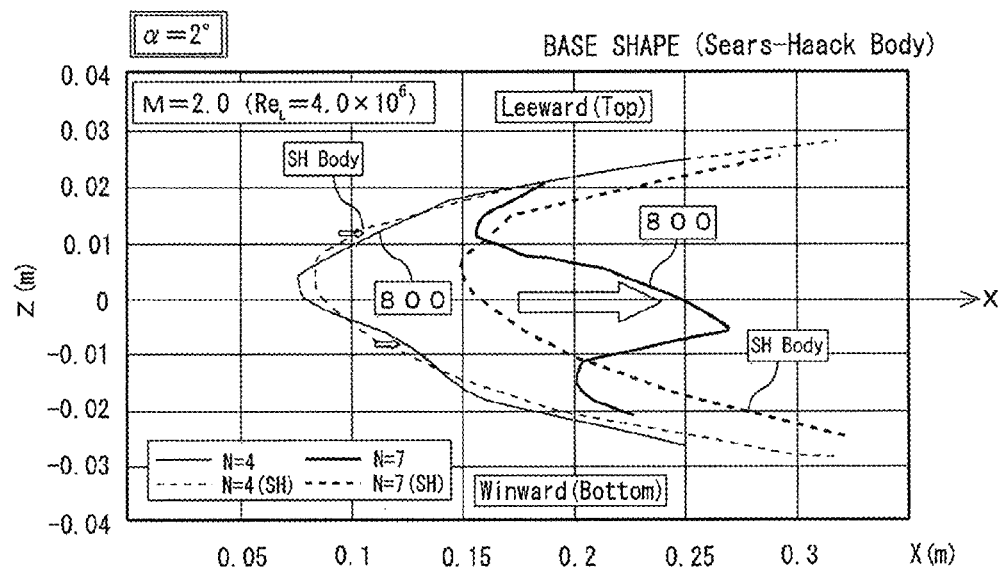
FIG. 23 is an illustrative view showing the boundary layer transition characteristic on the side face of the natural laminar flow nose of FIG. 21.

FIG. 23 is an illustrative view showing the boundary layer transition characteristic on a side face of the natural laminar flow nose 800 according to the present invention.

The figure shows the boundary layer transition location on the side face of the natural laminar flow nose 800 when placed at an angle of attack $\alpha=2°$ in an identical Mach 2 airflow to that of FIG. 3 (Reynolds number $R_{eL}$ based on overall axial direction length $L=4.0\times10^6$).

It was found as a result that the boundary layer transition locations having N=7 and N=4 as the threshold are delayed greatly from the base shape, albeit within a limited range of $-0.01\leq Z\leq 0.01$.

The above description is summarized in a following Table 1. Cases 8 to 14 and 16 are not shown in the drawings, but case 8 is an example of a nose on which only an axial direction wave-shaped sinusoidal deformation is applied to the base shape such that the separation suppression effect is obtained, cases 9 and 10 are examples of noses on which both an axial direction wave-shaped sinusoidal deformation and a circumferential direction wave-shaped sinusoidal deformation are applied to the base shape such that the natural laminar flow effect is obtained, and cases 11 and 12 are examples of noses on which both an axial direction wave-shaped sinusoidal deformation and a circumferential direction wave-shaped sinusoidal deformation are applied to the base shape such that the separation suppression effect is obtained.

Cases 13 to 14 and case 16 are examples of similar noses to the nose of case 15 (the natural laminar flow nose 400 described above), i.e. noses on which only a circumferential direction wave-shaped sinusoidal deformation is applied to the base shape such that the natural laminar flow effect is obtained.

Further, "-" on the table indicates that there is no particular need for the corresponding axial direction wave-shaped sinusoidal deformation or circumferential direction wave-shaped sinusoidal deformation.

TABLE 1

| | | | | | | | | DEFORMATION TO BASE SHAPE | | | | | | |
|---|---|---|---|---|---|---|---|---|---|---|---|---|---|---|
| | | | | | | | | AXIAL DIRECTION DEFORMATION | | | | | | |
| | | | | | | | | FIRST TERM | | | | SECOND TERM | | |
| | MAIN STREAM CONDITIONS | | | | REFERENCE RADIUS | | | AMPLITUDE | | | | AMPLITUDE | | |
| Case No. | M | α | $R_{eL}$ | BASE SHAPE | FIRST TERM $R_1$ | SECOND TERM $R_2$ | | COEFFICIENT $A_1$ | PHASE $C_1$ | WAVE NUMBER $m_1$ | $n_1$ | COEFFICIENT $A_2$ | PHASE $C_2$ | WAVE NUMBER $m_2$ $n_2$ |
| 1 | 2 | 2° | $4.0 \times 10^6$ | SH BODY | Rmax | — | | 0.1 | 1.0 | 0 | 1 | — | — | 0 0 |
| 2 | 1.5 | ↑ | $4.8 \times 10^6$ | ↑ | ↑ | — | | ↑ | ↑ | ↑ | ↑ | — | — | ↑ ↑ |
| 3 | 2.5 | ↑ | $3.2 \times 10^6$ | ↑ | ↑ | — | | ↑ | ↑ | ↑ | ↑ | — | — | ↑ ↑ |
| 4 | 2 | 1° | $4.0 \times 10^6$ | ↑ | ↑ | — | | ↑ | ↑ | ↑ | ↑ | — | — | ↑ ↑ |
| 5 | ↑ | 3° | ↑ | ↑ | ↑ | — | | ↑ | ↑ | ↑ | ↑ | — | — | ↑ ↑ |
| 6 | ↑ | 2° | $130.9 \times 10^6$ | ↑ | ↑ | — | | ↑ | $(1 - m/L)^1$ | ↑ | 10 | — | — | ↑ ↑ |
| 7 | ↑ | ↑ | $4.0 \times 10^6$ | FC BODY | ↑ | — | | ↑ | 1.0 | ↑ | 1 | — | — | ↑ ↑ |
| 8 | ↑ | ↑ | ↑ | SH BODY | R(x) | — | | 0.05 | ↑ | 1 | ↑ | — | — | ↑ ↑ |
| 9 | ↑ | ↑ | ↑ | ↑ | ↑ | — | | ↑ | ↑ | 0 | ↑ | — | — | ↑ ↑ |
| 10 | ↑ | ↑ | ↑ | ↑ | ↑ | — | | ↑ | ↑ | ↑ | ↑ | — | — | ↑ ↑ |
| 11 | ↑ | ↑ | ↑ | ↑ | ↑ | — | | ↑ | ↑ | 1 | ↑ | — | — | ↑ ↑ |
| 12 | ↑ | ↑ | ↑ | ↑ | ↑ | — | | ↑ | ↑ | ↑ | ↑ | — | — | ↑ ↑ |
| 13 | ↑ | ↑ | ↑ | ↑ | ↑ | — | | ↑ | ↑ | 0.5 | 0 | — | — | ↑ ↑ |
| 14 | ↑ | ↑ | ↑ | ↑ | ↑ | — | | ↑ | ↑ | 1.5 | ↑ | — | — | ↑ ↑ |
| 15 | ↑ | ↑ | ↑ | ↑ | ↑ | — | | ↑ | ↑ | 0.5 | ↑ | — | — | ↑ ↑ |
| 16 | ↑ | ↑ | ↑ | ↑ | ↑ | — | | ↑ | ↑ | 1.5 | ↑ | — | — | ↑ ↑ |
| 17 | ↑ | ↑ | ↑ | ↑ | Rmax | Rmax | | 0.033 | ↑ | 0 | 1 | 0.0066 | 1 | ↑ 2 |
| 18 | ↑ | ↑ | ↑ | ↑ | ↑ | ↑ | | ↑ | ↑ | ↑ | ↑ | ↑ | ↑ | ↑ ↑ |
| 19 | ↑ | ↑ | ↑ | ↑ | R(x) | — | | 0.05 | ↑ | 0.5 | 0 | — | — | ↑ 0 |
| 20 | ↑ | ↑ | ↑ | ↑ | ↑ | — | | ↑ | ↑ | 0 | 1 | — | — | ↑ ↑ |

SH BODY: SEARS-HAACK BODY
FC BODY: FLARED CONE

IN THE AXIAL DIRECTION DEFORMATION OF CASE 6, A WEIGHTING FUNCTION (x/L) IS APPLIED TO THE AMPLITUDE

IN CASES 1 TO 16 AND 19 TO 20, THERE IS NO AXIAL DIRECTION DEFORMATION RELATING TO THE SECOND TERM

| | | DEFORMATION TO BASE SHAPE | | | | | | |
|---|---|---|---|---|---|---|---|---|
| | | CIRCUMFERENTIAL DIRECTION DEFORMATION | | | | | | |
| | | FIRST TERM | | | SECOND TERM | | | |
| Case No. | AMPLITUDE $D_1$ | WAVE NUMBER $k_1$ | PHASE $r_1$ | AMPLITUDE $D_2$ | WAVE NUMBER $k_2$ | PHASE $r_2$ | AERODYNAMIC CHARACTERISTIC | REMARKS |
| 1 | 1 | 0 | 0 | 0 | — | — | NATURAL LAMINAR FLOW EFFECT | FIGS. 1, 3 |
| 2 | ↑ | ↑ | ↑ | ↑ | — | — | ↑ | FIGS. 1, 4 |
| 3 | ↑ | ↑ | ↑ | ↑ | — | — | ↑ | FIGS. 1, 5 |
| 4 | ↑ | ↑ | ↑ | ↑ | — | — | ↑ | FIGS. 1, 6 |
| 5 | ↑ | ↑ | ↑ | ↑ | — | — | ↑ | FIGS. 1, 7 |
| 6 | ↑ | ↑ | ↑ | ↑ | — | — | ↑ | FIGS. 8, 9 |
| 7 | ↑ | ↑ | ↑ | ↑ | — | — | ↑ | FIGS. 10, 11 |
| 8 | ↑ | ↑ | ↑ | ↑ | — | — | SEPARATION SUPPRESSION EFFECT | |
| 9 | ↑ | 2 | ↑ | ↑ | — | — | NATURAL LAMINAR FLOW EFFECT | |
| 10 | ↑ | 3 | ↑ | ↑ | — | — | ↑ | |
| 11 | ↑ | 2 | ↑ | ↑ | — | — | SEPARATION | |

TABLE 1-continued

| | | | | | | | | SUPPRESSION EFFECT |
|---|---|---|---|---|---|---|---|---|
| 12 | ↑ | 3 | ↑ | ↑ | — | — | ↑ | |
| 13 | ↑ | 2 | ↑ | ↑ | — | — | | NATURAL LAMINAR FLOW EFFECT |
| 14 | ↑ | ↑ | ↑ | ↑ | — | — | ↑ | |
| 15 | ↑ | 3 | ↑ | ↑ | — | — | ↑ | FIGS. 12, 13 |
| 16 | ↑ | ↑ | ↑ | ↑ | — | — | ↑ | |
| 17 | 1 | 0 | 0 | ↑ | — | — | ↑ | FIGS. 14, 15 |
| 18 | 0.1 | 2 | 0 | ↑ | — | — | ↑ | FIGS. 16, 17 |
| 19 | 1 | 3 | ↑ | 0.2 | 2 | 0 | ↑ | FIGS. 18 TO 20 |
| 20 | ↑ | ↑ | ↑ | ↑ | ↑ | ↑ | ↑ | FIGS. 21 TO 23 |

IN CASES 1 TO BAND 17, THERE IS NO CIRCUMFERENTIAL DIRECTION DEFORMATION RELATING TO THE FIRST TERM

IN CASES 1 TO 18, THERE IS NO CIRCUMFERENTIAL DIRECTION DEFORMATION RELATING TO THE SECOND TERM

FIGS. 24 to 37 show examples of natural laminar flow noses to which local wavy deformation for deforming a part of the base shape locally into a wave shape has been added, in the nose for a supersonic flying object according to the present invention.

Each natural laminar flow nose has a Sears-Haack body (an S-H body) as the base shape, and local wavy deformation expressed by following Equations 1, 4, 6, 5, and 7

$$dR(x, \phi) = W_x(x) \times \sum_{t=1}^{t_\infty} \{\Phi_t(\phi) \times \Psi_t(x, x_{0t}(\phi))\} \quad \text{[Equation 1]}$$

$$\Phi_t(\phi) = \varepsilon_{0t} + E_{0t} \int_{-\infty}^{\infty} d\beta \cdot E_t(\beta)\cos(\beta\{\phi - \phi_{0t}\}) \quad \text{[Equation 4]}$$

$$W_x(x) = W_x(x, x_w, w_x) \quad \text{[Equation 6]}$$

$$= \frac{\left[\tanh\left\{w_x \frac{(x-x_w)}{L}\right\} + \tanh\left\{w_x \frac{x_w}{L}\right\}\right] \times \left[\tanh\left\{w_x \frac{([L-x]-x_w)}{L}\right\} + \tanh\left\{w_x \frac{x_w}{L}\right\}\right]}{\left[\tanh\left\{w_x \frac{(L/2-x_w)}{L}\right\} + \tanh\left\{w_x \frac{x_w}{L}\right\}\right]^2}$$

$$\Psi_t(x, x_{0t}(\phi)) = F_{1t} \times \left(\left\{\tanh\left[\frac{(x-x_{0t}(\phi))}{L} \times F_{2t}\right] + 1\right\} \times \right. \quad \text{[Equation 5]}$$
$$\left\{-\tanh\left[\frac{(x-x_{0t}(\phi))}{L} \times F_{2t}\right] + 1\right\} + F_{3t}\right) +$$
$$G_{0t} \int_{-\infty}^{\infty} d\alpha \cdot G_t(\alpha)\cos(2\pi\alpha\{x - x_{0t}(\phi)\}/L)$$

$$x_{0t}(\phi) = x_{0t}(\phi, H_{1t}, H_{2t}, H_{3t}) \quad \text{[Equation 7]}$$
$$= [\tanh\{(\phi - \pi/2) \times H_{1t}\}/H_{3t} + H_{2t}] \times L$$

is added to an outer surface as a deformation element. In one example, parameters are modified by setting a sum $\Sigma$ in Equation 1 at $t_\infty=1$ (i.e. only one deformation component), and in another example, parameters are modified by setting the sum $\Sigma$ in Equation 1 at $t_\infty=2$ (i.e. a sum of two deformation components).

Note that when a product term including $E_{0t}$ on the right side of Equation 4 and a product term including $G_{0t}$ on the right side of Equation 5 are set at $$E_t(\beta) = \sqrt{2\pi}\lambda_t e^{-(\lambda_t^2 \beta^2/2)}, \; G_t(\alpha) = \sqrt{2\pi}\kappa_t e^{-(\kappa_t^2 \alpha^2/2)} \quad \text{[Equation 8]}$$

the respective product terms become equal to a Gauss distribution-shaped deformation expressed by $$2\pi E_{0t} e^{-\frac{1}{2\lambda_t^2}\{\phi-\phi_{0t}\}^2} \quad \text{[Equation 9]}$$
$$2\pi G_{0t} e^{-\frac{2\pi^2}{\kappa_t^2}\frac{\{x-x_{0t}(\phi)\}^2}{L^2}}$$

and therefore, in the respective examples, the product term including $E_{0t}$ on the right side of Equation 4 and the product term including $G_{0t}$ on the right side of Equation 5 are inserted into Equation 9 such that the shape is determined with $\lambda_1$, $\kappa_1$ as respective parameters.

Figure 24:
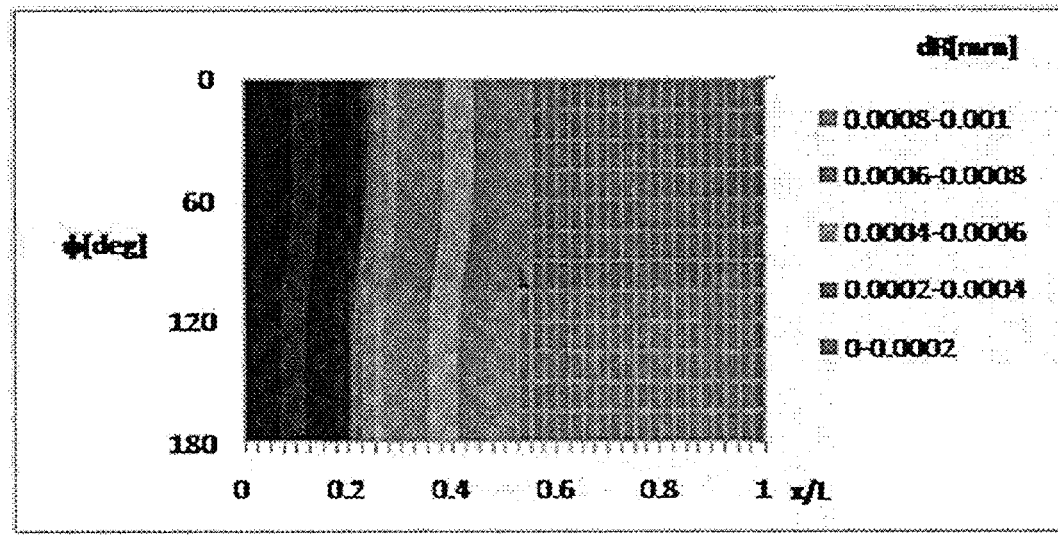
FIG. 24 is a development contour showing local wavy deformation in an example of a natural laminar flow nose in which local wavy deformation is added to an outer peripheral surface of an Sears-Haack body (an S-H body)

FIG. 24 is a development contour showing local wavy deformation in an example of a natural laminar flow nose in which local wavy deformation is added to an outer peripheral surface of an S-H body.

To facilitate understanding of the local wavy deformation applied to the base shape, the development contour of FIG. 24 takes the form of a rectangle in which the ordinate shows an angle from 0° on an upper side of the central axis to 180° on a lower side of the central axis and the abscissa shows a distance from the tip, while bulge from the base shape is expressed by a contour with color gradation (a similar shape is obtained from 0° to −180°). Development contour showing examples to be described below take a similar form.

In this example, the sum $\Sigma$ in Equation 1 is set at $t_\infty=1$ (i.e. only one deformation component), and $x_w=0.0033$, $w_x=30$ in Equation 6,
$\varepsilon_{01}=1$ in Equation 4,
$E_{01}=0$, $\phi_{01}=9.118907$, $\lambda_1=0.548311$ in Equation 9 replacing Equation 4,
$F_{11}=0.001416$, $F_{21}=3.5$, $F_{31}=-0.423077$ in Equation 5,
$G_{01}=0$, $\kappa_1=0.85$ in Equation 9 replacing Equation 5, and
$H_{11}=-2.5$, $H_{21}=0.25$, $H_{31}=65.0$ in Equation 7.

Figure 25:
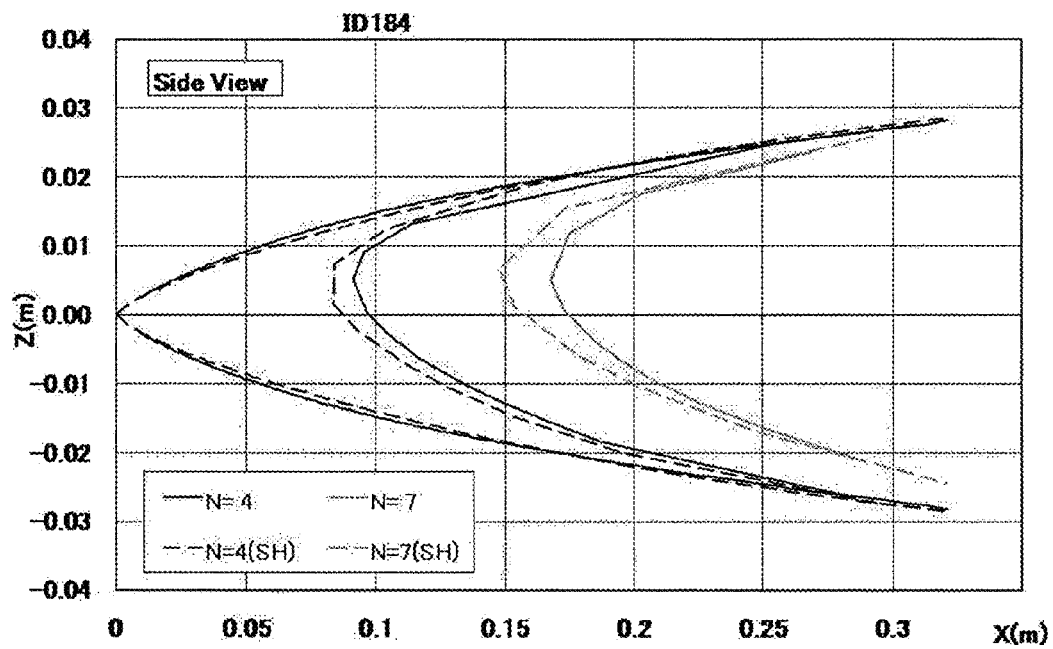
FIG. 25 is an illustrative view showing the boundary layer transition characteristic on a side face of the natural laminar flow nose of FIG. 24.

FIG. 25 shows the boundary layer transition location on the side face of this natural laminar flow nose when placed at an angle of attack $\alpha=2°$ in a Mach 2 airflow (Reynolds number $R_{eL}$ based on overall axial direction length $L=4.0 \times 10^6$).

It is evident that in this example, the boundary layer transition locations having $N=7$ and $N=4$ as the threshold are delayed relative to the S-H body serving as the base shape, which is indicated by a dotted line.

Figure 26:
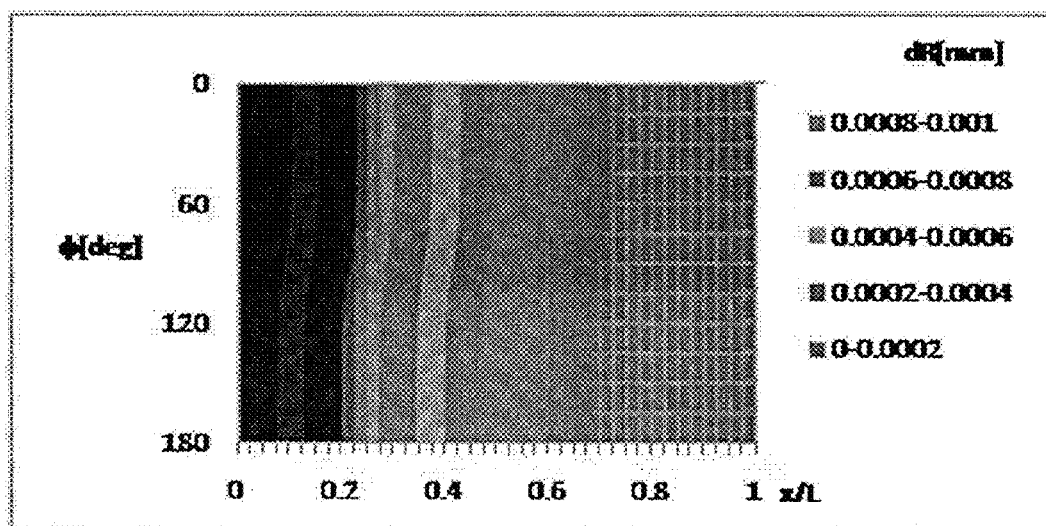
FIG. 26 is a development contour showing local wavy deformation in another example of a natural laminar flow nose in which local wavy deformation is added to the outer peripheral surface of the S-H body.

In an example of a natural laminar flow nose shown in the development contour of FIG. 26, in which local wavy deformation is added to the outer peripheral surface of the S-H body, the sum $\Sigma$ in Equation 1 is set at $t_\infty=1$ (i.e. only one deformation component), $x_w=0.0033$, $w_x=30$ in Equation 6,
$\epsilon_{01}=1$ in Equation 4,
$E_{01}=0$, $\phi_{01}=9.118907$, $\lambda_1=0.548311$ in Equation 9 replacing Equation 4,
$F_{11}=0$, $F_{21}=3.5$, $F_{31}=-0.001815$ in Equation 5,
$G_{01}=0.000132$, $\kappa_1=0.85$ in Equation 9 replacing Equation 5, and
$H_{11}=-2.5$, $H_{21}=0.25$, $H_{31}=65.0$ in Equation 7.

Figure 27:
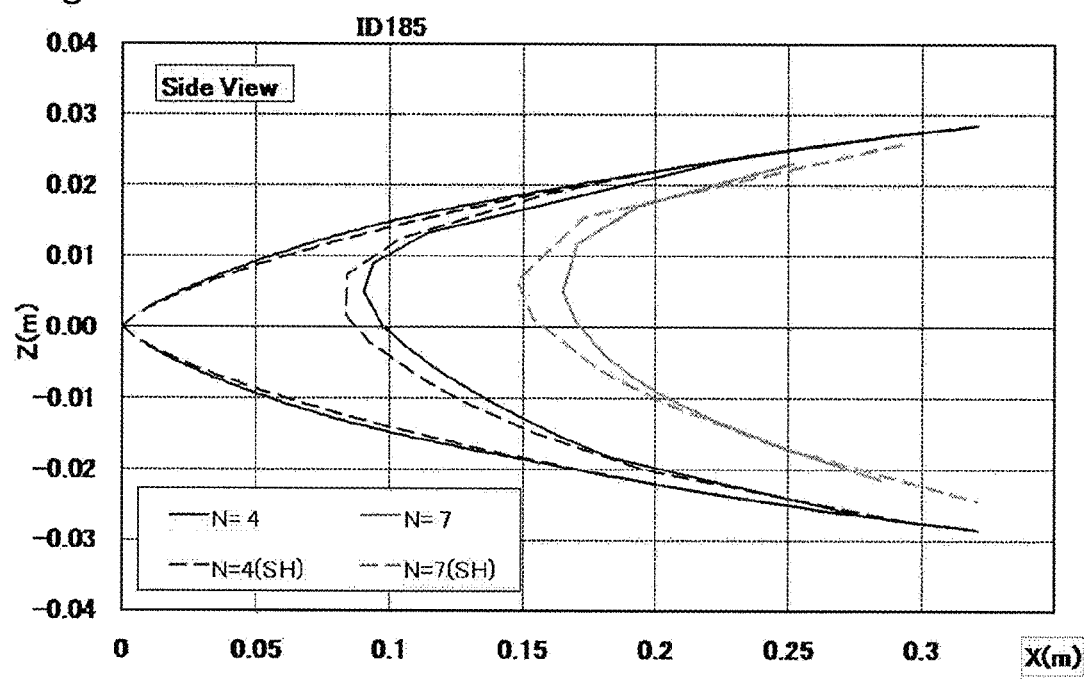
FIG. 27 is an illustrative view showing the boundary layer transition characteristic on a side face of the natural laminar flow nose of FIG. 26.

FIG. 27 shows the boundary layer transition location on the side face of this natural laminar flow nose when placed at an angle of attack $\alpha=2°$ in a Mach 2 airflow (Reynolds number $R_{eL}$ based on overall axial direction length $L=4.0\times 10^6$).

Likewise in this example, it is evident that the boundary layer transition locations having N=7 and N=4 as the threshold are delayed relative to the S-H body serving as the base shape, which is indicated by a dotted line.

Figure 28:
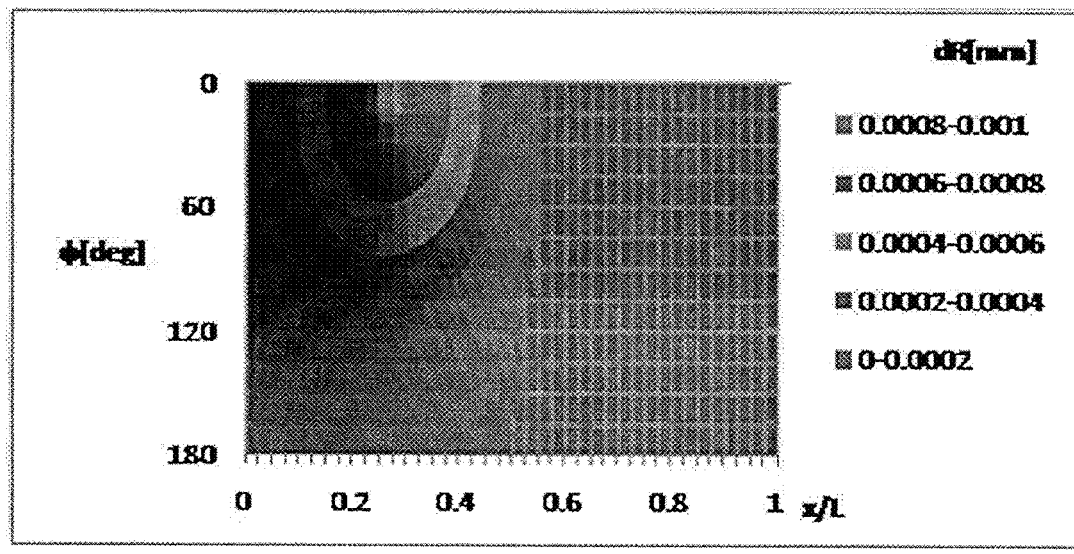
FIG. 28 is a development contour showing local wavy deformation in a further example of a natural laminar flow nose in which local wavy deformation is added to the outer peripheral surface of the S-H body.

In an example of a natural laminar flow nose shown in the development contour of FIG. 28, in which local wavy deformation is added to the outer peripheral surface of the S-H body, the sum $\Sigma$ in Equation 1 is set at $t_\infty=1$ (i.e. only one deformation component), $x_w=0.0033$, $w_x=30$ in Equation 6,
$\epsilon_{01}=0$ in Equation 4,
$E_{01}=0.159155$, $\phi_{01}=9.118907$, $\lambda_1=1.096623$ in Equation 9 replacing Equation 4,
$F_{11}=0.001416$, $F_{21}=3.5$, $F_{31}=-0.423077$ in Equation 5,
$G_{01}=0$, $\kappa_1=0.85$ in Equation 9 replacing Equation 5, and
$H_{11}=-2.5$, $H_{21}=0.25$, $H_{31}=65.0$ in Equation 7.

Figure 29:
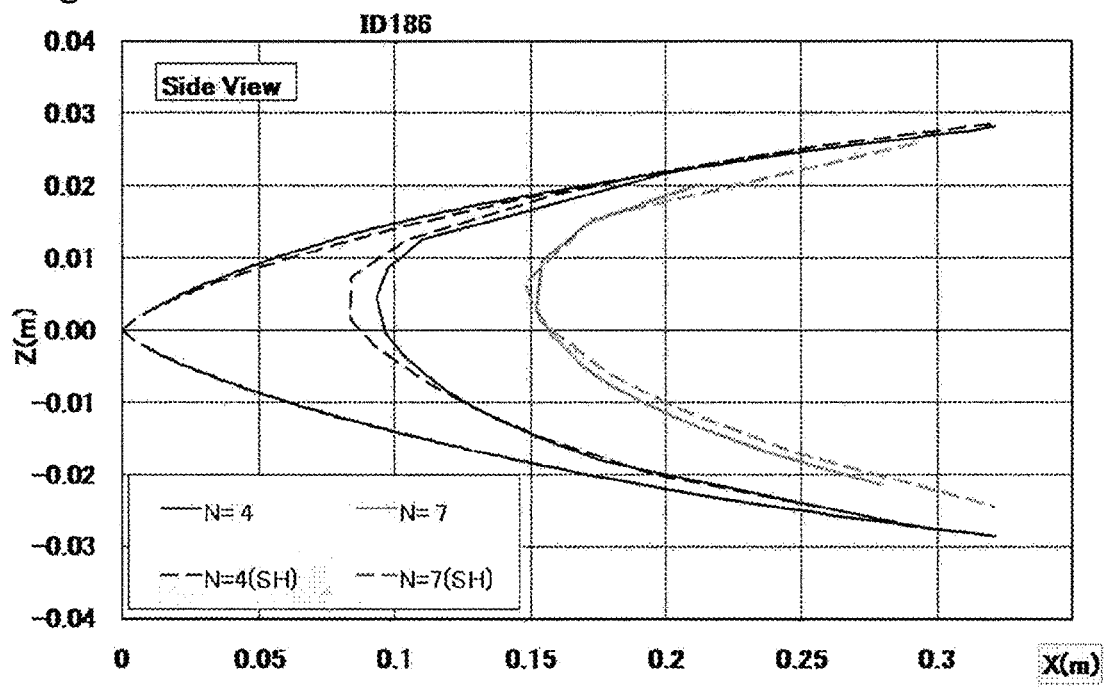
FIG. 29 is an illustrative view showing the boundary layer transition characteristic on a side face of the natural laminar flow nose of FIG. 28.

FIG. 29 shows the boundary layer transition location on the side face of this natural laminar flow nose when placed at an angle of attack $\alpha=2°$ in a Mach 2 airflow (Reynolds number $R_{eL}$ based on overall axial direction length $L=4.0\times 10^6$).

In this example, it is evident that the boundary layer transition location having N=7 as the threshold is advanced in comparison with the S-H body serving as the base shape, indicated by a dotted line, whereas the boundary layer transition location having N=4 as the threshold is more or less delayed in comparison with the S-H body serving as the base shape, indicated by the dotted line.

Figure 30:
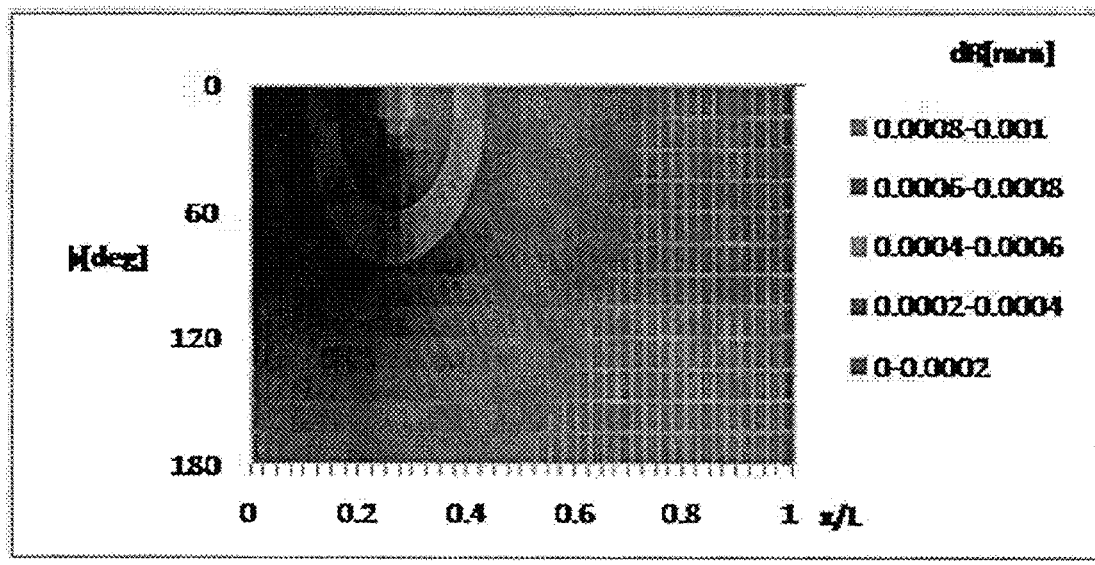
FIG. 30 is a development contour showing local wavy deformation in a further example of a natural laminar flow nose in which local wavy deformation is added to the outer peripheral surface of the S-H body.

In an example of a natural laminar flow nose shown in the development contour of FIG. 30, in which local wavy deformation is added to the outer peripheral surface of the S-H body, the sum $\Sigma$ in Equation 1 is set at $t_\infty=1$ (i.e. only one deformation component), $x_w=0.0033$, $w_x=30$ in Equation 6,
$\epsilon_{01}=0$ in Equation 4,
$E_{01}=0.159155$, $\phi_{01}=9.118907$, $\lambda_1=1.096623$ in Equation 9 replacing Equation 4,
$F_{11}=0$, $F_{21}=3.5$, $F_{31}=-0.001815$ in Equation 5,
$G_{01}=0.000132$, $\kappa_1=0.85$ in Equation 9 replacing Equation 5, and
$H_{11}=-2.5$, $H_{21}=0.25$, $H_{31}=65.0$ in Equation 7.

Figure 31:
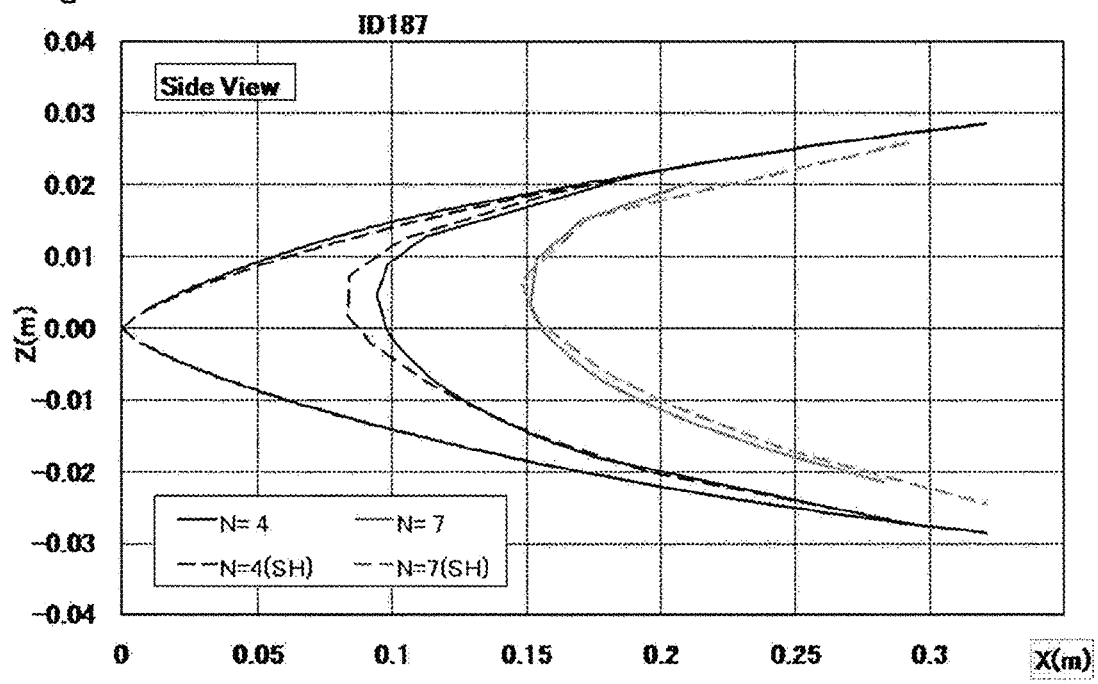
FIG. 31 is an illustrative view showing the boundary layer transition characteristic on a side face of the natural laminar flow nose of FIG. 30.

FIG. 31 shows the boundary layer transition location on the side face of this natural laminar flow nose when placed at an angle of attack $\alpha=2°$ in a Mach 2 airflow (Reynolds number $R_{eL}$ based on overall axial direction length $L=4.0\times 10^6$).

In this example, it is evident that the boundary layer transition location having N=7 as the threshold is advanced in comparison with the S-H body serving as the base shape, indicated by a dotted line, whereas the boundary layer transition location having N=4 as the threshold is more or less delayed in comparison with the S-H body serving as the base shape, indicated by the dotted line.

Figure 32:
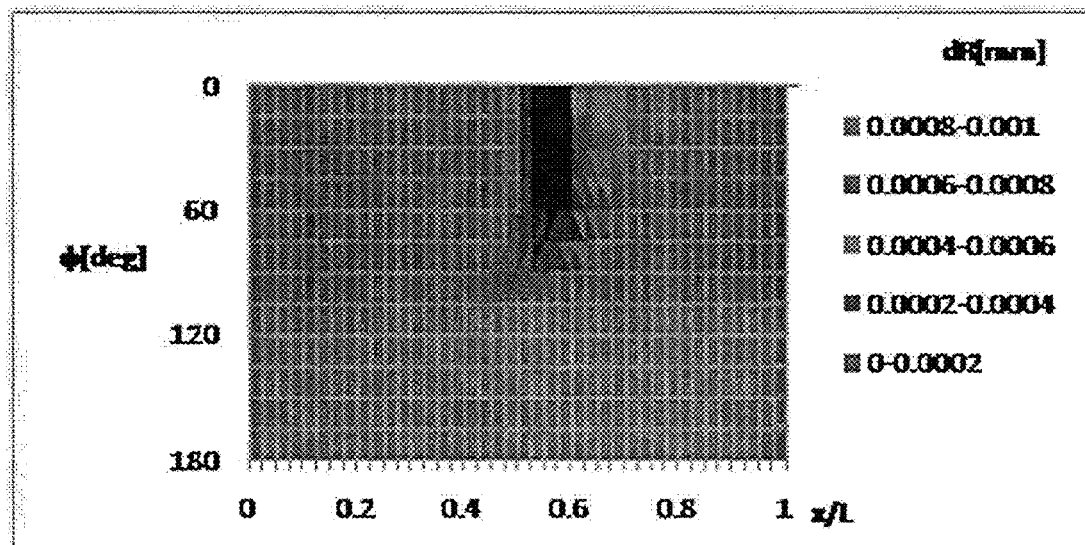
FIG. 32 is a development contour showing local wavy deformation in a further example of a natural laminar flow nose in which local wavy deformation is added to the outer peripheral surface of the S-H body.

In an example of a natural laminar flow nose shown in the development contour of FIG. 32, in which local wavy deformation is added to the outer peripheral surface of the S-H body, the sum $\Sigma$ in Equation 1 is set at $t_\infty=1$ (i.e. only one deformation component), $x_w=0.0033$, $w_x=30$ in Equation 6,
$\epsilon_{01}=0$ in Equation 4,
$E_{01}=0.159155$, $\phi_{01}=7.599089$, $\lambda_1=0.548311$ in Equation 9 replacing Equation 4,
$F_{11}=0$, $F_{21}=3.5$, $F_{31}=-0.001815$ in Equation 5,
$G_{01}=0.000066$, $\kappa_1=0.20$ in Equation 9 replacing Equation 5, and
$H_{11}=-2.5$, $H_{21}=0.50$, $H_{31}=10.0$ in Equation 7.

Figure 33:
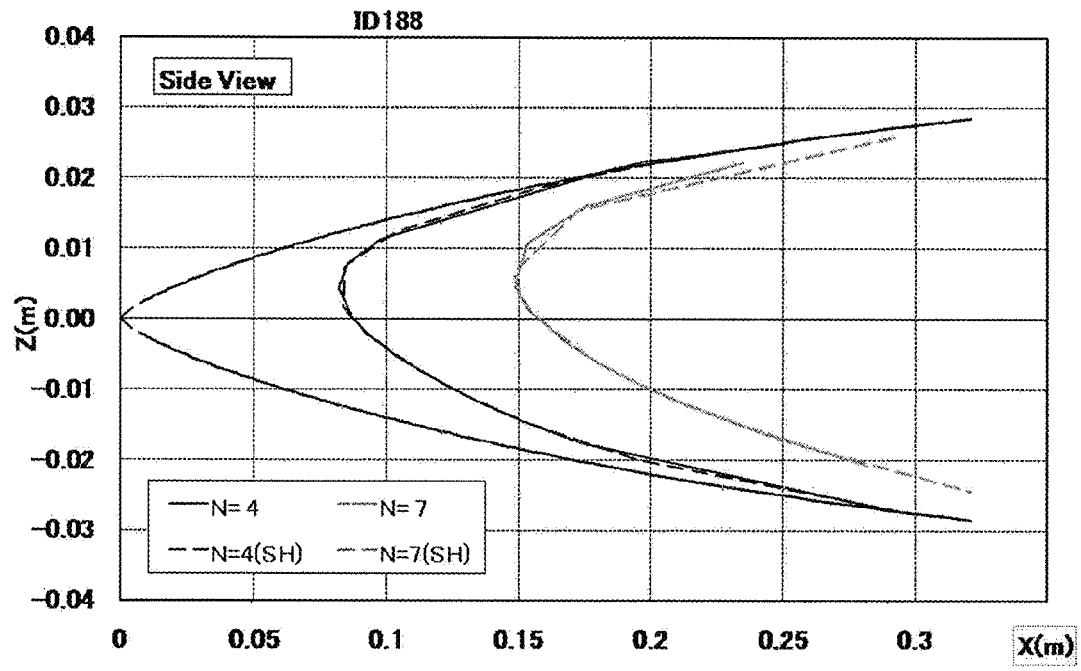
FIG. 33 is an illustrative view showing the boundary layer transition characteristic on a side face of the natural laminar flow nose of FIG. 32.

FIG. 33 shows the boundary layer transition location on the side face of this natural laminar flow nose when placed at an angle of attack $\alpha=2°$ in a Mach 2 airflow (Reynolds number $R_{eL}$ based on overall axial direction length $L=4.0\times 10^6$).

In this example, it is evident that the boundary layer transition location having N=7 as the threshold is advanced in comparison with the S-H body serving as the base shape, indicated by a dotted line, whereas the boundary layer transition location having N=4 as the threshold is slightly delayed in comparison with the S-H body serving as the base shape, indicated by the dotted line.

Figure 34:
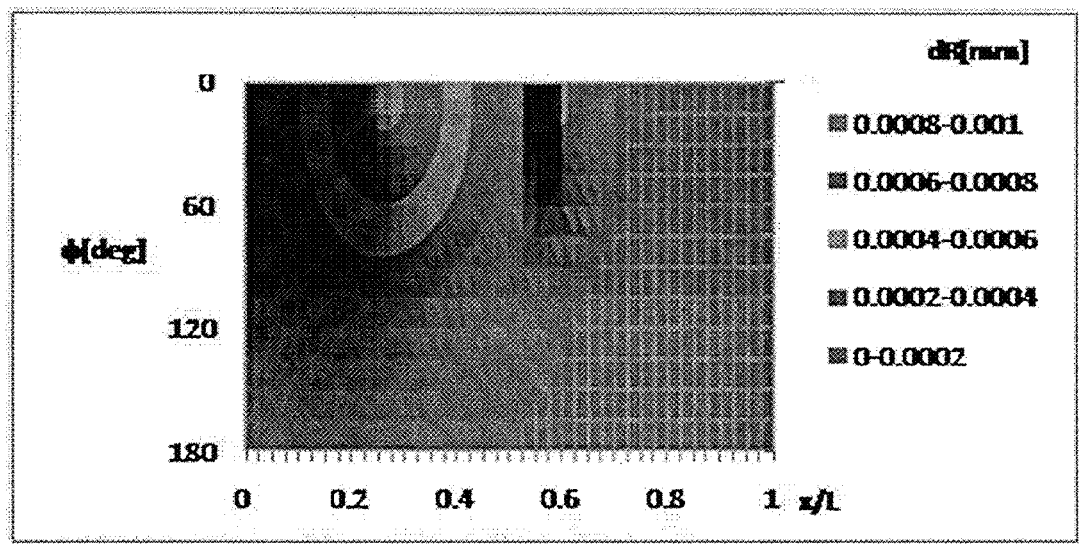
FIG. 34 is a development contour showing local wavy deformation in a further example of a natural laminar flow nose in which local wavy deformation is added to the outer peripheral surface of the S-H body.

In an example of a natural laminar flow nose shown in the development contour of FIG. 34, in which local wavy deformation is added to the outer peripheral surface of the S-H body, the sum $\Sigma$ in Equation 1 is set at $t_\infty=2$ (i.e. the sum of two deformation components), $x_w=0.0033$, $w_x=30$ in Equation 6,
the first deformation component is set such that
$\epsilon_{01}=0$ in Equation 4,
$E_{01}=0.159155$, $\phi_{01}=9.118907$, $\lambda_1=1.096623$ in Equation 9 replacing Equation 4,
$F_{11}=0$, $F_{21}=3.5$, $F_{31}=-0.001815$ in Equation 5,
$G_{01}=0.000132$, $\kappa_1=0.85$ in Equation 9 replacing Equation 5, and
$H_{11}=-2.5$, $H_{21}=0.25$, $H_{31}=65.0$ in Equation 7, and
the second deformation component is set such that
$\epsilon_{02}=0$ in Equation 4,
$E_{02}=0.159155$, $\phi_{02}=7.599089$, $\lambda_2=0.548311$ in Equation 9 replacing Equation 4,
$F_{12}=0$, $F_{22}=3.5$, $F_{32}=-0.001815$ in Equation 5,
$G_{02}=0.000066$, $\kappa_2=0.2$ in Equation 9 replacing Equation 5, and
$H_{12}=-2.5$, $H_{22}=0.5$, $H_{32}=10.0$ in Equation 7.

Figure 35:
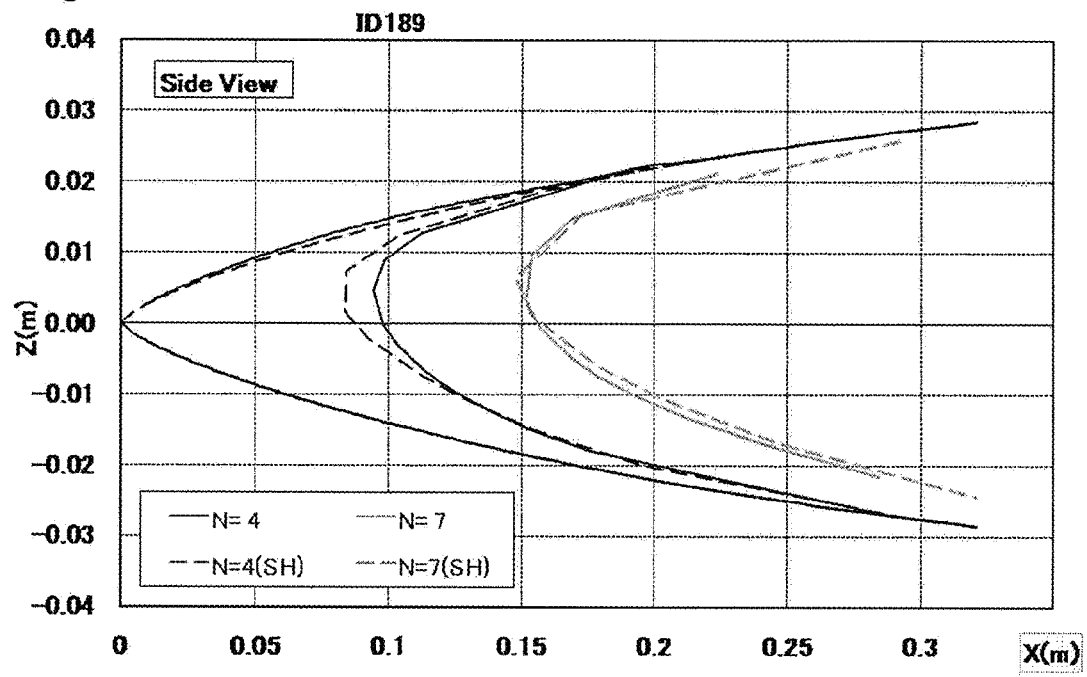
FIG. 35 is an illustrative view showing the boundary layer transition characteristic on a side face of the natural laminar flow nose of FIG. 34.

FIG. 35 shows the boundary layer transition location on the side face of this natural laminar flow nose when placed at an angle of attack $\alpha=2°$ in a Mach 2 airflow (Reynolds number $R_{eL}$ based on overall axial direction length $L=4.0\times 10^6$).

In this example, it is evident that the boundary layer transition location having N=7 as the threshold is advanced in comparison with the S-H body serving as the base shape, indicated by a dotted line, whereas the boundary layer transition location having N=4 as the threshold is delayed in comparison with the S-H body serving as the base shape, indicated by the dotted line.

Figure 36:
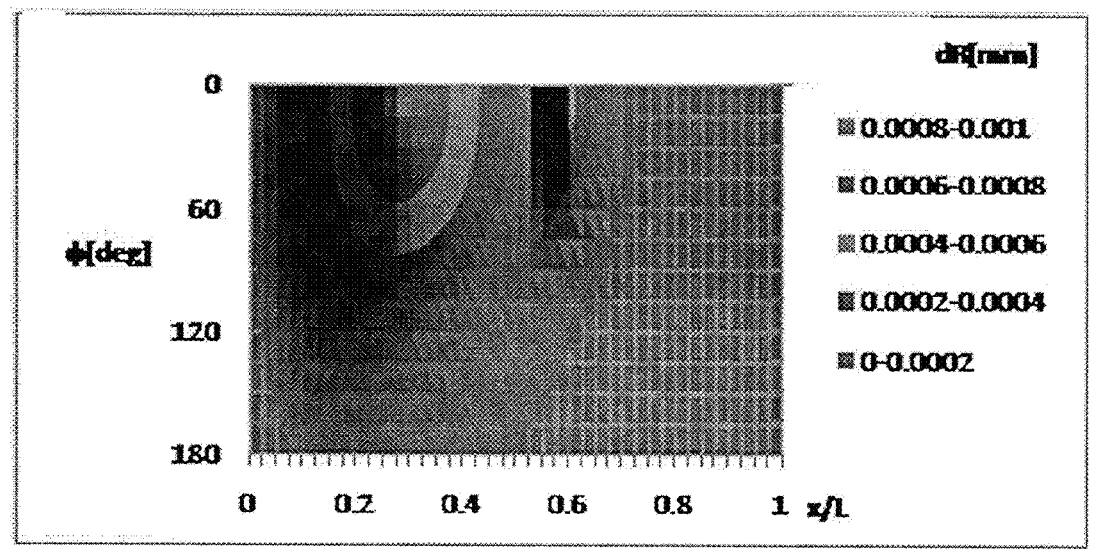
FIG. 36 is a development contour showing local wavy deformation in a further example of a natural laminar flow nose in which local wavy deformation is added to the outer peripheral surface of the S-H body.

In an example of a natural laminar flow nose shown in the development contour of FIG. 36, in which local wavy deformation is added to the outer peripheral surface of the SH body, the sum $\Sigma$ in Equation 1 is set at $t_\infty=2$ (i.e. the sum of two deformation components), $x_w=0.03$, $w_x=10$ in Equation 6, the first deformation component is set such that $\epsilon_{01}=0$ in Equation 4, $E_{01}=0.159155$, $\phi_{01}=9.118907$, $\lambda_1=1.096623$ in Equation 9 replacing Equation 4, $F_{11}=0$, $F_{21}=3.5$, $F_{31}=-0.001815$ in Equation 5, $G_{01}=0.000132$, $\kappa_1=0.85$ in Equation 9 replacing Equation 5, and $H_{11}=-2.5$, $H_{21}=0.25$, $H_{31}=65.0$ in Equation 7, and the second deformation component is set such that $\epsilon_{02}=0$ in Equation 4, $E_{02}=0.159155$, $\phi_{02}=7.599089$, $\lambda_2=0.548311$ in Equation 9 replacing Equation 4, $F_{12}=0$, $F_{22}=3.5$, $F_{32}=-0.001815$ in Equation 5, $G_{02}=0.000066$, $\kappa_2=0.2$ in Equation 9 replacing Equation 5, and $H_{12}=-2.5$, $H_{22}=0.5$, $H_{32}=10.0$ in Equation 7.

Figure 37:
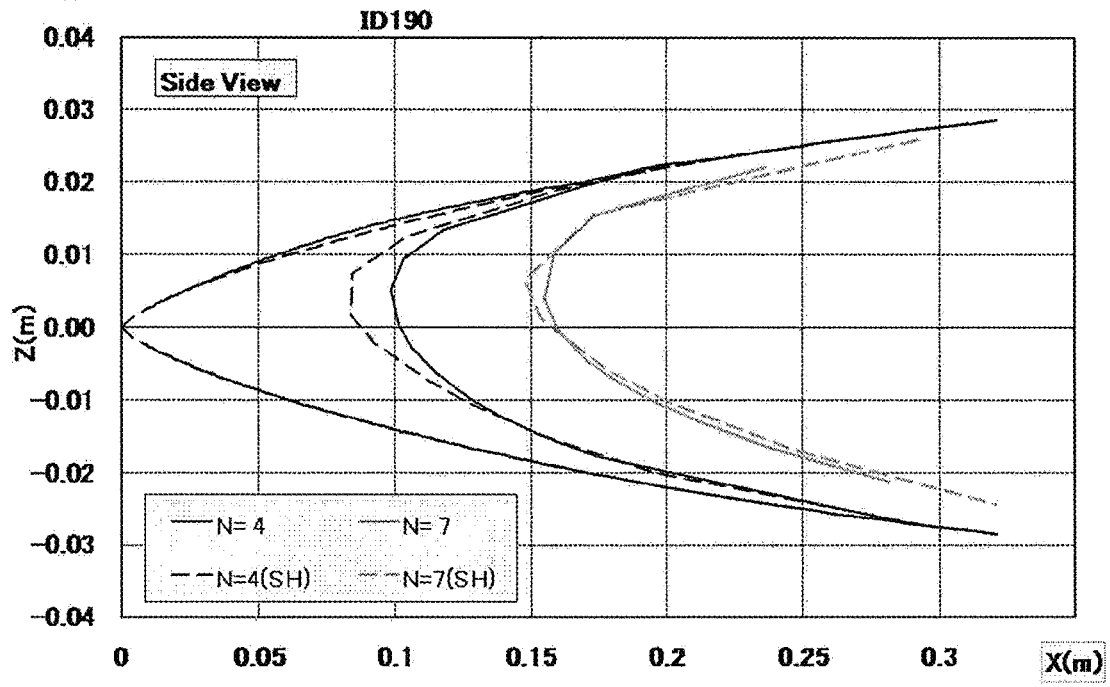
FIG. 37 is an illustrative view showing the boundary layer transition characteristic on a side face of the natural laminar flow nose of FIG. 36.
Figure 38:
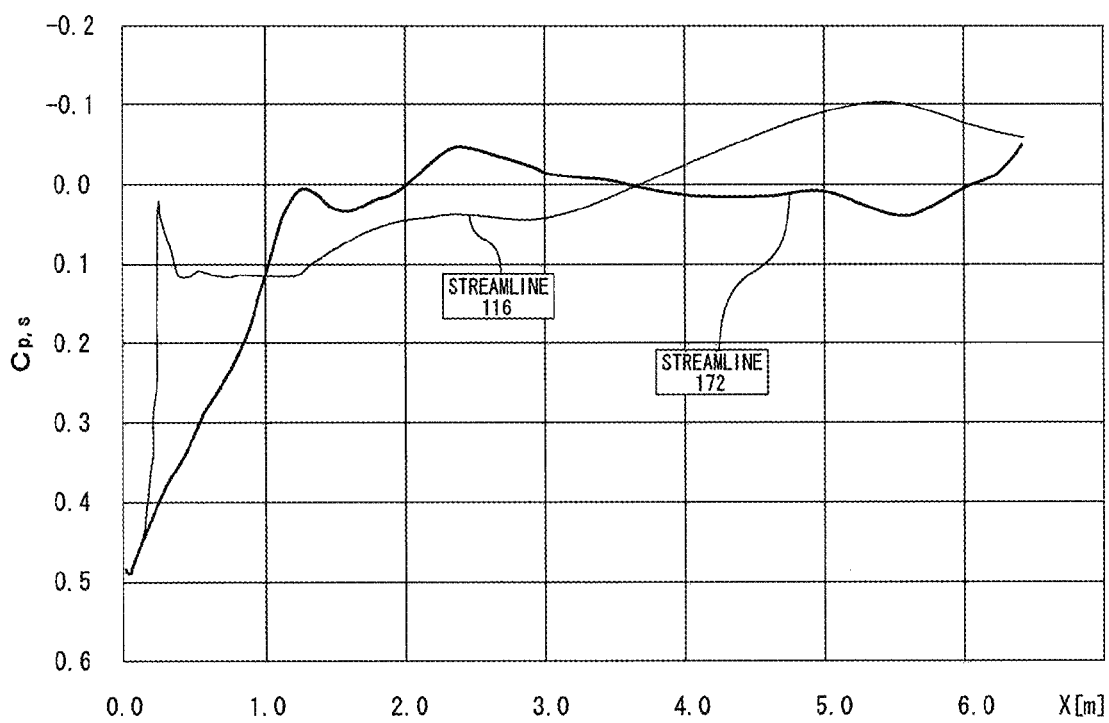
FIG. 38 is an illustrative view showing a pressure distribution of a silent supersonic (known as S3TD) 2.5 shape.
Figure 39:
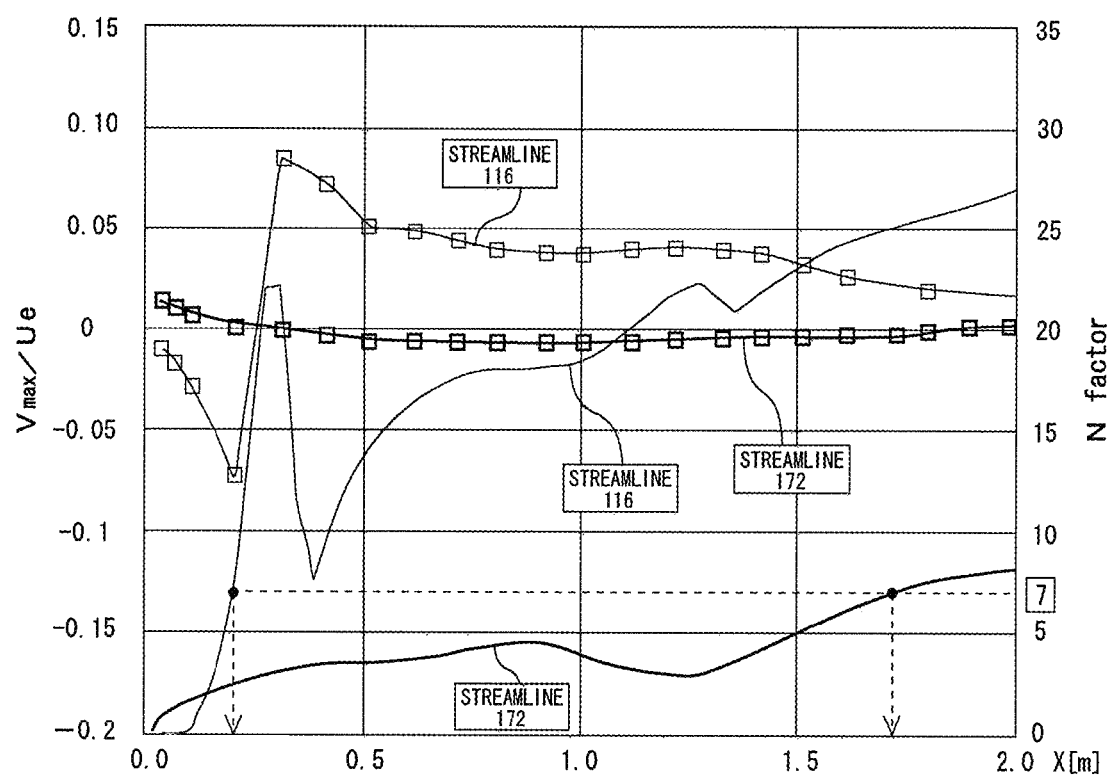
FIG. 39 is an illustrative view showing a cross-flow velocity and the boundary layer transition characteristic of the silent supersonic (known as S3TD) 2.5 shape.

FIG. 37 shows the boundary layer transition location on the side face of this natural laminar flow nose when placed at an angle of attack $\alpha=2°$ in a Mach 2 airflow (Reynolds number $R_{eL}$ based on overall axial direction length $L=4.0\times 10^6$).

In this example, it is evident that the boundary layer transition location having N=7 as the threshold is partially advanced in comparison with the S-H body serving as the base shape, indicated by a dotted line, whereas the boundary layer transition location having N=4 as the threshold is delayed in comparison with the S-H body serving as the base shape, indicated by the dotted line.

INDUSTRIAL APPLICABILITY

The nose for a supersonic flying object according to the present invention can be applied to a nose-shaped object for a flying object that flies at a supersonic speed.

The invention claimed is:

1. A nose for a supersonic flying object, having a body shape symmetrical about a central axis as a base shape, and having a shape obtained by deforming said base shape by a deformation component having a wavy shape, characterized in that:
   said base shape described by local radius R(x) is approximately a cone shape having a linear, simple convex curve, or simple concave curve generatrix;
   said deformation component is a sinusoidal deformation for deforming said base shape as a whole into a wave shape in at least one of a circumferential direction and an axial direction, which is expressed by $$dR(x,\phi) = W_x(x) \times \sum_{t=1}^{t_\infty} \{\Phi_t(\phi) \times \Psi_t(x, x_{0t}(\phi))\} \quad \text{[Equation 1]}$$

as modulation of the local radius R(x),
where $\Phi(\phi)$ is a circumferential direction deformation component term,
$\Psi(x, x_{0t}(\phi))$ is an axial direction deformation component term,
x is an axial direction location from a tip of the nose,
$\phi$ is a circumferential direction angle from a leeward ray of symmetry of the nose,
L is an overall axial direction length,
$W_x(x)$ is a weighting function for ensuring zero deformation on respective axial direction ends (x=0 and x=L),
$t_\infty=1$; and
said circumferential direction deformation component term and said axial direction deformation component term are expressed by $$\Phi_t(\phi) = \sum_{j=0}^{j_\infty} D_j \times \cos\{k_j \times \phi + r_j(x/L)\} \quad \text{[Equation 2]}$$

$$\Psi_t(x, x_0=0) = \sum_{i=0}^{i_\infty} [B_i(x) \times \sin\{2\pi \times n_i \times (x/L) + \pi \times m_i\}] \quad \text{[Equation 3]}$$

where $x_{0t}(\phi)=x_0=0$,
D, k, r, B (x), n, and m are terms dependent on a circumferential direction amplitude, a circumferential direction wave number, a circumferential direction phase, an amplitude having x in said axial direction as a function, an axial direction wave number, and an axial direction phase, respectively;
D=0–1
k=0–3
r=0
m=0–1.5
n=0–2 and
D+k+t+m+n>0.

2. The nose for a supersonic flying object according to claim 1, characterized in that said base shape is a Sears-Haack body or a flared cone.

3. A nose for a supersonic flying object, having a body shape symmetrical about a central axis as a base shape, and having a shape obtained by deforming said base shape by a deformation component having a wavy shape, characterized in that:
   said base shape described by local radius R(x) is approximately a cone shape having a linear, simple convex curve, or simple concave curve generatrix,
   said deformation component is a local wavy deformation for deforming a part of said base shape locally into a wave shape, which is expressed by $$dR(x,\phi) = W_x(x) \times \sum_{t=1}^{t_\infty} \{\Phi_t(\phi) \times \Psi_t(x, x_{0t}(\phi))\} \quad \text{[Equation 1]}$$

as modulation of the local Radius R(x),
where $\Phi(\phi)$ is a circumferential direction deformation component term,
$\Psi(x, x_{0t}(\phi))$ is an axial direction deformation component term,
x is an axial direction location from a tipoff the nose,
$\phi$ is a circumferential direction angle from a leeward ray of symmetry of the nose,
L is an overall axial direction length,
$W_x(x)$ is a weighting function for ensuring zero deformation on respective axial direction ends (x=0 and x=L), and $t_\infty = 2$; and said circumferential direction deformation component term and said axial direction deformation component term are expressed by $$\Phi_t(\phi) = \varepsilon_{0t} + E_{0t} \int_{-\infty}^{\infty} d\beta \cdot E_t(\beta) \cos(\beta\{\phi - \phi_{0t}\})$$ [Equation 4]

$$\Psi_t(x, x_{0t}(\phi)) = F_{1t} \times \left(\left\{\tanh\left[\frac{(x-x_{0t}(\phi))}{L} \times F_{2t}\right] + 1\right\} \times \right.$$
$$\left.\left\{-\tanh\left[\frac{(x-x_{0t}(\phi))}{L} \times F_{2t}\right] + 1\right\} + F_{3t}\right) +$$
$$G_{0t} \int_{-\infty}^{\infty} d\alpha \cdot G_t(\alpha) \cos(2\pi\alpha\{x - x_{0t}(\phi)\}/L)$$ [Equation 5]

where $\epsilon_{0t}$, $E_{0t}$, $E_t$ are respectively terms relating to a circumferential direction amplitude, $F_{1t}$, $F_{3t}$, $G_{0t}$, $G_t$ are respectively terms relating to an axial direction amplitude, $\alpha$, $F_{2t}$ are terms relating to an axial direction wave number, $\beta$ is a circumferential direction wave number, $\phi_{0t}$ is a circumferential direction deformation location, $x_{0t}(\phi)$ is any function relating to an axial direction deformation location.

$\epsilon_{0t} = 0-1$,
$E_{0t} = 0-0.159155$,
$\phi_{0t} = 7.599089-9.118907$,
$F_{1t} = 0-0.001416$,
$F_{2t} = 3.5$,
$F_{3t} = -0.423077--0.001815$, and
$G_{0t} = 0-0.000132$.

4. The nose for a supersonic flying object according to claim 3, characterized in that said base shape is a Sears-Haack body or a flared cone.

* * * * *